US010487684B2

(12) United States Patent
Fracchia et al.

(10) Patent No.: US 10,487,684 B2
(45) Date of Patent: Nov. 26, 2019

(54) GAS TURBINE ENGINE FAN BLADE CONTAINMENT SYSTEMS

(71) Applicant: THE BOEING COMPANY, Chicago, IL (US)

(72) Inventors: Carlos Angelo Fracchia, Ballwin, MO (US); Karen M. Jost, St. Louis, MO (US); Mark David Higgins, Woodinville, WA (US); Colleen M. Harper, Lake St. Louis, MO (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 15/476,038

(22) Filed: Mar. 31, 2017

(65) Prior Publication Data

US 2018/0283205 A1    Oct. 4, 2018

(51) Int. Cl.
| | |
|---|---|
| *F04D 29/38* | (2006.01) |
| *F01D 21/04* | (2006.01) |
| *F04D 19/00* | (2006.01) |
| *F04D 29/52* | (2006.01) |
| *B64D 27/20* | (2006.01) |
| *B64D 29/06* | (2006.01) |

(52) U.S. Cl.
CPC .......... *F01D 21/045* (2013.01); *B64D 27/20* (2013.01); *B64D 29/06* (2013.01); *F04D 19/002* (2013.01); *F04D 29/38* (2013.01); *F04D 29/522* (2013.01); *F04D 29/526* (2013.01); *F05D 2220/323* (2013.01); *F05D 2230/51* (2013.01); *F05D 2230/80* (2013.01); *F05D 2260/311* (2013.01); *Y02T 50/672* (2013.01)

(58) Field of Classification Search
None
See application file for complete search history.

(56) References Cited

U.S. PATENT DOCUMENTS

| | | |
|---|---|---|
| 3,602,602 A | 8/1971 | Motta |
| 3,722,355 A | 3/1973 | King |
| 3,801,416 A | 4/1974 | Gulbierz |

(Continued)

FOREIGN PATENT DOCUMENTS

| | | |
|---|---|---|
| EP | 2447157 | 5/2012 |
| GB | 2262313 | 6/1993 |

OTHER PUBLICATIONS

European Patent Office, "Extended European Search Report," issued in connection with European Patent Application No. 18158036.6, dated Oct. 24, 2018, 13 pages.

(Continued)

*Primary Examiner* — Michael Lebentritt
(74) *Attorney, Agent, or Firm* — Hanley, Flight & Zimmerman, LLC

(57) ABSTRACT

Gas turbine engine fan blade containment systems are disclosed. An example fan blade containment system includes a shield to be coupled to an aircraft structure and to at least partially surround a circumference of an aircraft engine. The shield is to be spaced from an outer surface the aircraft engine when the shield is coupled to the aircraft structure. The shield is to form a laminated clevis at an end of the shield. A retention rod is to be positioned in the laminated clevis of the shield. The retention rod is to engage a lug hook of the aircraft structure to anchor the shield to the aircraft structure.

17 Claims, 9 Drawing Sheets

(56) References Cited

U.S. PATENT DOCUMENTS

| | | |
|---|---|---|
| 3,855,632 A | 12/1974 | Davis |
| 3,924,038 A | 12/1975 | McArdle et al. |
| 3,936,219 A | 2/1976 | Holmes |
| 3,974,313 A | 8/1976 | James |
| 3,989,407 A | 11/1976 | Cunningham |
| 4,044,550 A | 8/1977 | Vermilye |
| 4,057,359 A | 11/1977 | Grooman |
| 4,063,847 A | 12/1977 | Simmons |
| 4,090,005 A | 5/1978 | Morgan |
| 4,125,053 A | 11/1978 | Lasker |
| 4,149,824 A | 4/1979 | Adamson |
| 4,197,052 A | 4/1980 | Lardellier |
| 4,199,300 A | 4/1980 | Tubbs |
| 4,200,677 A | 4/1980 | Bottini et al. |
| 4,377,370 A | 3/1983 | Porcelli |
| 4,397,608 A | 8/1983 | Husain et al. |
| 4,411,589 A | 10/1983 | Joubert et al. |
| 4,417,848 A | 11/1983 | Dembeck |
| 4,425,080 A | 1/1984 | Stanton et al. |
| 4,452,563 A | 6/1984 | Belanger et al. |
| 4,452,565 A | 6/1984 | Monhardt et al. |
| 4,474,346 A | 10/1984 | Murphy et al. |
| 4,475,864 A | 10/1984 | Patacca et al. |
| 4,484,856 A | 11/1984 | Patacca |
| 4,490,092 A | 12/1984 | Premont |
| 4,500,252 A | 2/1985 | Monhardt et al. |
| 4,503,104 A | 3/1985 | Belanger et al. |
| 4,534,968 A | 8/1985 | Tomich |
| 4,547,122 A | 10/1985 | Leech |
| 4,566,237 A | 1/1986 | Turner |
| 4,584,228 A | 4/1986 | Droste |
| 4,598,449 A | 7/1986 | Monhardt et al. |
| 4,639,188 A | 1/1987 | Swadley |
| 4,648,795 A | 3/1987 | Lardellier |
| 4,666,371 A | 5/1987 | Alderson |
| 4,699,567 A | 10/1987 | Stewart |
| 4,705,454 A | 11/1987 | Bouiller et al. |
| 4,718,818 A | 1/1988 | Premont |
| 4,818,176 A | 4/1989 | Huether et al. |
| 4,836,084 A | 6/1989 | Vogelesang et al. |
| 4,878,821 A | 11/1989 | Huether et al. |
| 4,902,201 A | 2/1990 | Neubert |
| 4,917,569 A | 4/1990 | Kimberlin |
| 4,934,899 A | 6/1990 | Patacca |
| 4,961,685 A | 10/1990 | Neubert |
| 5,160,248 A | 11/1992 | Clarke |
| 5,163,809 A | 11/1992 | Akgun et al. |
| 5,188,505 A | 2/1993 | Schilling et al. |
| 5,259,724 A | 11/1993 | Liston et al. |
| 5,272,954 A | 12/1993 | Crouch |
| 5,273,393 A | 12/1993 | Jones et al. |
| 5,328,324 A | 7/1994 | Dodd |
| 5,336,044 A | 8/1994 | Forrester |
| 5,344,280 A | 9/1994 | Langenbrunner et al. |
| 5,403,148 A | 4/1995 | Forrester |
| 5,408,826 A | 4/1995 | Stewart et al. |
| 5,409,349 A | 4/1995 | Kulak et al. |
| 5,413,456 A | 5/1995 | Kulak et al. |
| 5,431,532 A | 7/1995 | Humke et al. |
| 5,437,538 A | 8/1995 | Mitchell |
| 5,443,365 A | 8/1995 | Ingling et al. |
| 5,447,411 A | 9/1995 | Curley et al. |
| 5,482,429 A | 1/1996 | Penda |
| 5,486,086 A | 1/1996 | Bellia et al. |
| 5,513,949 A | 5/1996 | Armstrong |
| 5,516,257 A | 5/1996 | Kasprow et al. |
| 5,605,441 A | 2/1997 | Boszor et al. |
| 5,613,830 A | 3/1997 | Chan et al. |
| 5,622,472 A | 4/1997 | Glowacki |
| 5,823,739 A | 10/1998 | Van Duyn |
| 5,851,932 A | 12/1998 | Dickson et al. |
| 5,885,056 A | 3/1999 | Goodwin |
| 6,003,424 A | 12/1999 | Cordova et al. |
| 6,053,696 A | 4/2000 | Roberts |
| 6,059,523 A | 5/2000 | Modafferi et al. |
| 6,059,524 A | 5/2000 | Costa et al. |
| 6,113,347 A | 9/2000 | Forrester |
| 6,120,242 A | 9/2000 | Bonnoitt et al. |
| 6,146,089 A | 11/2000 | Allen et al. |
| 6,149,380 A | 11/2000 | Kuzniar et al. |
| 6,179,551 B1 | 1/2001 | Sathianathan et al. |
| 6,182,531 B1 | 2/2001 | Gallagher et al. |
| 6,206,155 B1 | 3/2001 | Schneider |
| 6,206,631 B1 | 3/2001 | Schilling |
| 6,217,277 B1 | 4/2001 | Liu et al. |
| 6,224,321 B1 | 5/2001 | Ebden et al. |
| 6,227,794 B1 | 5/2001 | Wojtyczka et al. |
| 6,290,455 B1 | 9/2001 | Hemmelgarn et al. |
| 6,371,721 B1 | 4/2002 | Sathianathan et al. |
| 6,394,746 B1 | 5/2002 | Sathianathan et al. |
| 6,468,026 B1 | 10/2002 | Bonnoitt et al. |
| 6,497,550 B2 | 12/2002 | Booth |
| 6,543,991 B2 | 4/2003 | Sathianathan et al. |
| 6,575,694 B1 | 6/2003 | Thompson et al. |
| 6,612,217 B1 | 9/2003 | Shockey et al. |
| 6,637,186 B1 | 10/2003 | Van Duyn |
| 6,638,008 B2 | 10/2003 | Sathianathan et al. |
| 6,652,222 B1 | 11/2003 | Wojtyczka et al. |
| 6,695,574 B1 | 2/2004 | Mather |
| 6,739,830 B2 | 5/2004 | Sathianathan et al. |
| 6,769,864 B2 | 8/2004 | Sathianathan et al. |
| 6,814,541 B2 | 11/2004 | Evans et al. |
| 6,829,883 B2 | 12/2004 | Sathianathan et al. |
| 6,837,674 B2 | 1/2005 | Phillips, III |
| 6,913,436 B2 | 7/2005 | McMillan et al. |
| 6,979,172 B1 | 12/2005 | Mackenzie |
| 7,008,173 B2 | 3/2006 | Gabrys et al. |
| 7,076,942 B2 | 7/2006 | Schreiber |
| 7,087,296 B2 | 8/2006 | Porter |
| 7,192,243 B2 | 3/2007 | Lawson et al. |
| 7,246,990 B2 | 7/2007 | Xie et al. |
| 7,255,528 B2 | 8/2007 | Stretton |
| 7,338,250 B2 | 3/2008 | Martindale et al. |
| 7,390,161 B2 | 6/2008 | Xie et al. |
| 7,402,022 B2 | 7/2008 | Harper et al. |
| 7,445,421 B2 | 11/2008 | Sathianathan |
| 7,503,164 B2 | 3/2009 | McMillan |
| 7,513,734 B2 | 4/2009 | McMillan |
| 7,517,184 B2 | 4/2009 | Costa et al. |
| 7,524,161 B2 | 4/2009 | Lawson et al. |
| 7,597,040 B2 | 10/2009 | Gabrys |
| 7,604,199 B2 | 10/2009 | McMillan et al. |
| 7,713,021 B2 | 5/2010 | Finn et al. |
| 7,766,603 B2 | 8/2010 | Beckford et al. |
| 7,806,364 B1 | 10/2010 | Udall |
| 7,866,939 B2 | 1/2011 | Harper et al. |
| 7,874,136 B2 | 1/2011 | Heyerman |
| 7,914,251 B2 | 3/2011 | Pool et al. |
| 7,954,418 B2 | 6/2011 | Gabrys |
| 7,959,405 B2 | 6/2011 | Launders |
| 8,016,543 B2 | 9/2011 | Braley et al. |
| 8,021,102 B2 | 9/2011 | Xie et al. |
| 8,029,231 B2 | 10/2011 | Evans |
| 8,046,915 B2 | 11/2011 | Xie et al. |
| 8,047,764 B2 | 11/2011 | Launders |
| 8,061,966 B2 | 11/2011 | Xie et al. |
| 8,087,873 B2 | 1/2012 | Cacace |
| 8,166,746 B2 | 5/2012 | Heyerman |
| 8,191,254 B2 | 6/2012 | Cardarella, Jr. |
| 8,202,041 B2 | 6/2012 | Wojtyczka et al. |
| 8,231,328 B2 | 7/2012 | Reed |
| 8,297,912 B2 | 10/2012 | Reed |
| 8,317,456 B2 | 11/2012 | Cardarella, Jr. |
| 8,333,558 B2 | 12/2012 | Finn et al. |
| 8,371,803 B2 | 2/2013 | Evans |
| 8,403,624 B2 | 3/2013 | Xie et al. |
| 8,425,178 B2 | 4/2013 | Lenk |
| 8,434,995 B2 | 5/2013 | Pool et al. |
| 8,454,298 B2 | 6/2013 | Cardarella, Jr. |
| 8,528,328 B2 | 9/2013 | Stroph et al. |
| 8,545,167 B2 | 10/2013 | Cheung |
| 8,591,172 B2 | 11/2013 | Bottome |
| 8,647,049 B2 | 2/2014 | Evans et al. |
| 8,662,824 B2 | 3/2014 | Chatelois et al. |

(56) References Cited

U.S. PATENT DOCUMENTS

| | | | |
|---|---|---|---|
| 8,672,609 B2 | 3/2014 | Lussier et al. | |
| 8,757,958 B2 | 6/2014 | Lussier | |
| 8,807,918 B2 | 8/2014 | Hagshenas | |
| 8,827,629 B2 | 9/2014 | Voleti et al. | |
| 8,858,156 B2 | 10/2014 | Swenson et al. | |
| 8,869,673 B2 | 10/2014 | Townsend et al. | |
| 8,926,277 B2 | 1/2015 | Walters | |
| 8,986,797 B2 | 3/2015 | Xie | |
| 9,032,706 B2 | 5/2015 | Marshall | |
| 9,062,565 B2 | 6/2015 | Mahan | |
| 9,085,992 B2 | 7/2015 | Evans | |
| 9,097,139 B2 | 8/2015 | McMillan | |
| 9,109,462 B2 | 8/2015 | Suciu et al. | |
| 9,114,882 B2 | 8/2015 | Robertson, Jr. et al. | |
| 9,140,138 B2 | 9/2015 | Corson | |
| 9,169,045 B2 | 10/2015 | Clark | |
| 9,220,310 B2 | 12/2015 | Hawkins et al. | |
| 9,222,368 B2 | 12/2015 | Harper et al. | |
| 9,248,612 B2 | 2/2016 | Zhu et al. | |
| 9,284,843 B2 | 3/2016 | Koch, IV | |
| 9,291,070 B2 | 3/2016 | Fielding et al. | |
| 9,321,238 B2 | 4/2016 | Bird et al. | |
| 9,341,116 B2 | 5/2016 | Gerez et al. | |
| 2001/0028840 A1 | 10/2001 | Booth | |
| 2002/0141859 A1 | 10/2002 | Sathianathan et al. | |
| 2002/0164244 A1 | 11/2002 | Sathianathan et al. | |
| 2003/0138316 A1 | 7/2003 | Sathianathan et al. | |
| 2004/0037694 A1 | 2/2004 | Mather | |
| 2004/0076508 A1 | 4/2004 | Phillips, III | |
| 2004/0146393 A1 | 7/2004 | Evans et al. | |
| 2004/0161331 A1 | 8/2004 | Binetruy et al. | |
| 2005/0025615 A1 | 2/2005 | Gabrys et al. | |
| 2005/0089391 A1 | 4/2005 | Stretton | |
| 2005/0276683 A1 | 12/2005 | Lapergue et al. | |
| 2007/0081887 A1 | 4/2007 | Xie et al. | |
| 2007/0110557 A1 | 5/2007 | Lawson et al. | |
| 2007/0253804 A1 | 11/2007 | Heyerman | |
| 2007/0280817 A1 | 12/2007 | Costa et al. | |
| 2008/0199301 A1 | 8/2008 | Cardarella, Jr. | |
| 2008/0232951 A1 | 9/2008 | Cardarella | |
| 2009/0067979 A1 | 3/2009 | Braley et al. | |
| 2009/0087309 A1 | 4/2009 | Schreiber | |
| 2009/0110538 A1 | 4/2009 | Kostka et al. | |
| 2009/0155044 A1 | 6/2009 | Xie et al. | |
| 2009/0175714 A1 | 7/2009 | Cacace | |
| 2009/0226310 A1 | 9/2009 | Finn et al. | |
| 2010/0028129 A1 | 2/2010 | Reed | |
| 2010/0028130 A1 | 2/2010 | Reed | |
| 2010/0077721 A1 | 4/2010 | Marshall | |
| 2010/0150696 A1 | 6/2010 | Lenk | |
| 2010/0202872 A1 | 8/2010 | Weidmann | |
| 2010/0266384 A1 | 10/2010 | Evans et al. | |
| 2011/0076132 A1 | 3/2011 | Bottome | |
| 2011/0081227 A1 | 4/2011 | McMillan | |
| 2011/0138769 A1* | 6/2011 | Costa | F01D 25/24 60/39.091 |
| 2011/0217156 A1 | 9/2011 | McMillan | |
| 2012/0039703 A1 | 2/2012 | Swenson et al. | |
| 2012/0134774 A1 | 5/2012 | Clark | |
| 2012/0207583 A1 | 8/2012 | Voleti et al. | |
| 2012/0224949 A1 | 9/2012 | Harper et al. | |
| 2013/0055881 A1* | 3/2013 | Bird | B32B 5/26 89/36.02 |
| 2013/0136577 A1 | 5/2013 | Evans | |
| 2013/0149103 A1 | 6/2013 | Stevenson et al. | |
| 2013/0323008 A1 | 12/2013 | Corson | |
| 2013/0336761 A1 | 12/2013 | Evans | |
| 2014/0227076 A1 | 8/2014 | Hoyland et al. | |
| 2014/0286748 A1 | 9/2014 | Costa et al. | |
| 2014/0363270 A1 | 12/2014 | Feldmann et al. | |
| 2015/0016945 A1 | 1/2015 | Kappes et al. | |
| 2015/0275695 A1 | 10/2015 | Evans et al. | |
| 2016/0003084 A1 | 1/2016 | Husband et al. | |
| 2016/0053632 A1 | 2/2016 | Watson | |
| 2018/0230855 A1* | 8/2018 | Heeter | B29C 70/00 |
| 2018/0283204 A1* | 10/2018 | Fracchia | F04D 29/526 |
| 2018/0320633 A1* | 11/2018 | Moniz | B64D 29/00 |

OTHER PUBLICATIONS

United States Patent and Trademark Office, "Non-Final Office Action," issued in connection with U.S. Appl. No. 15/476,027, dated Feb. 28, 2019, 43 pages.

European Patent Office, "Communication pursuant to Article 94(3)," issued in connection with European Patent Application No. 18 158 039.0, dated Oct. 4, 2019, 6 pages.

United States Trademark and Patent Office, "Notice of Allowance and Fee(s) Due," issued in connection with U.S. Appl. No. 15/476,027, dated Aug. 28, 2019, 30 pages.

* cited by examiner

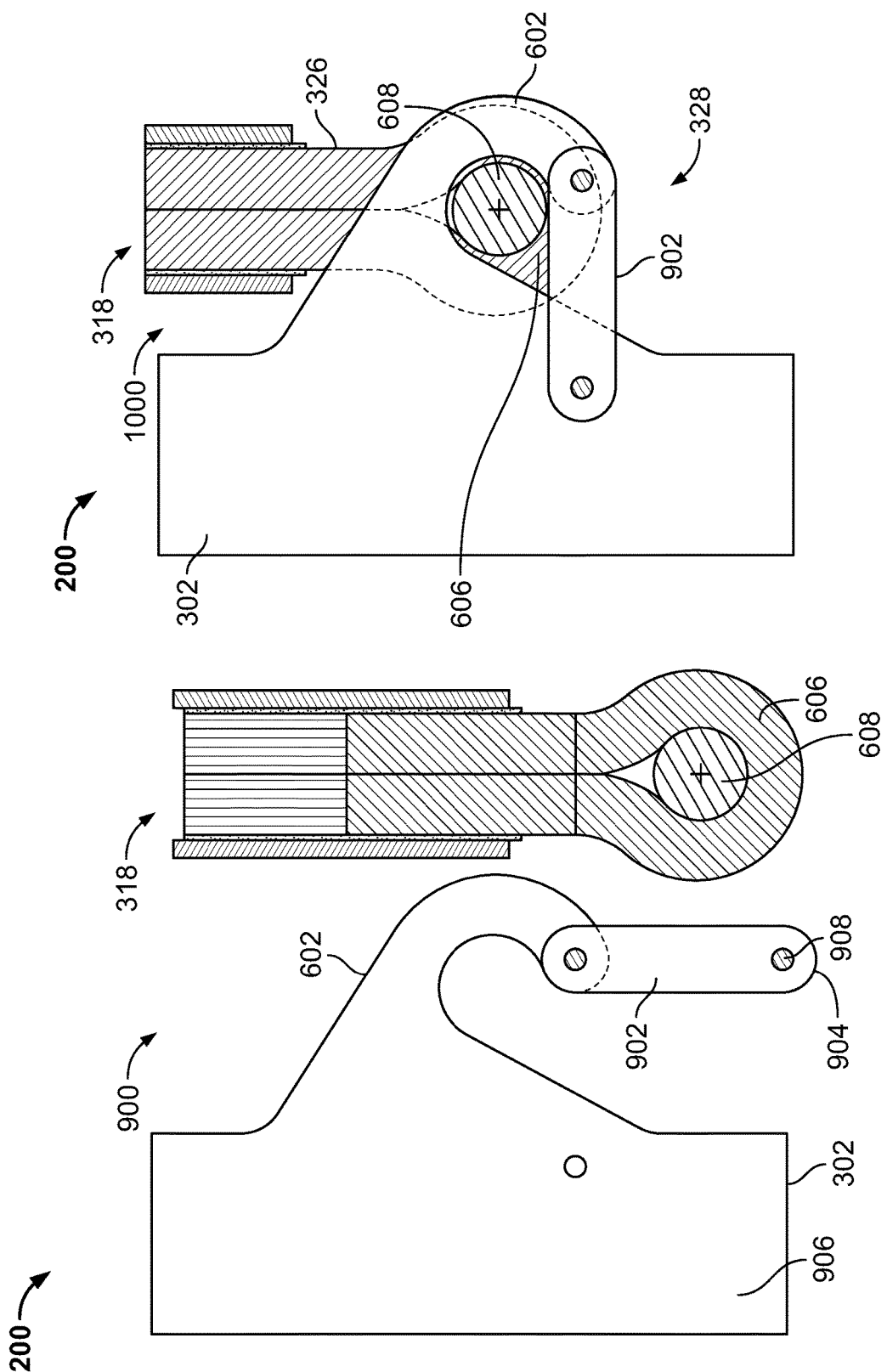

US 10,487,684 B2

GAS TURBINE ENGINE FAN BLADE CONTAINMENT SYSTEMS

FIELD OF THE DISCLOSURE

This disclosure relates generally to aircraft gas turbine engines and, more particularly, to fan blade containment systems.

BACKGROUND

For safety and survivability reasons, airplanes with multiple gas turbine engines are typically required to have gas turbine engine fan blade containment (GTEFBC) systems, which are typically integrated with each engine. In the event of a fan blade failure, these systems prevent fan blade fragments from being ejected through the fan casing of the faulty engine. By doing so, these systems protect the surrounding engines, critical subsystems, weapons, and airframe structure from damage and allow the pilot to continue flying and safely land the airplane. Airplanes with a single jet engine, on the other hand, are typically not required to have GTEFBC systems because they add weight and cost to the aircraft and because they may reduce the likelihood of survival of the pilot and the aircraft. In some instances, an ejected fan blade that is contained within an engine housing may cause more damage to the surrounding fan blades and engine machinery than a fan blade that can escape from the engine. In the event of a fan blade failure in a single engine airplane, the pilot will either eject immediately or attempt to continue flying and land, depending on the severity of the damage to the airplane.

BRIEF DESCRIPTION OF THE DRAWINGS

FIG. 9 illustrates the fan blade containment system of FIGS. 1-3, 4A, 4B, 5-8 disclosed herein decoupled from an example aircraft structure.

FIG. 10 illustrates the fan blade containment system of FIGS. 1-3, 4A, 4B, 5-8 disclosed herein coupled to an example aircraft structure.

Figure 1:
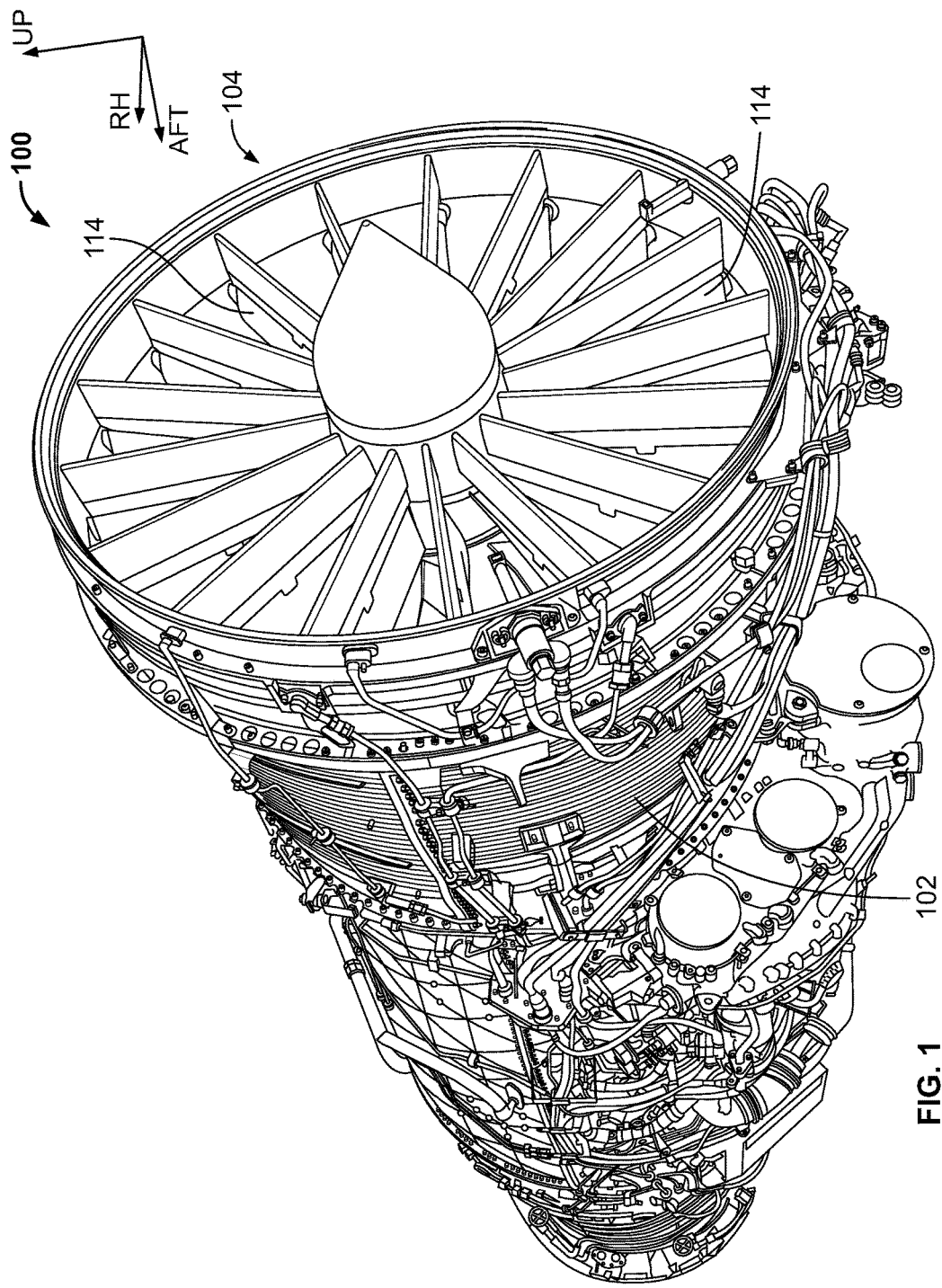
FIG. 1 is an example aircraft engine without an integral fan blade containment system.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part (e.g., with one or more intermediate part(s) located there between). Stating that any part is in direct contact with another part means that there is no intermediate part between the two parts.

SUMMARY

An example fan blade containment system includes a shield to be coupled to an aircraft structure and to at least partially surround a circumference of an aircraft engine. The shield is to form a laminated clevis at an end of the shield. A retention rod is to be positioned in the laminated clevis of the shield.

Another example fan blade containment system includes a shield having a unitary body including a first end and a second end opposite the first end. The shield includes an impact absorbing material that is to absorb kinetic energy from fan blade fragments during a fan blade failure event. A first retention rod is coupled to the first end of the shield. The first retention rod is to couple the shield to a first structural member of an aircraft structure. A second retention rod is coupled to the second end of the shield. The second retention rod is to couple the shield to a second structural member of the aircraft structure.

A fan blade containment system includes a means for capturing and absorbing impact energy of fan blade fragments during a fan blade failure event of an aircraft engine. The means for capturing and absorbing is to be spaced from an outer surface of the aircraft engine when the means for capturing and absorbing is coupled to the aircraft structure. The means for capturing and absorbing having a terminating end that includes means for coupling the means for capturing and absorbing to the aircraft structure. The means for coupling includes: means for fastening the terminating end of the means for capturing and absorbing to the aircraft structure; and means for receiving the means for fastening.

DETAILED DESCRIPTION

Engine selection is one of the most important steps in new aircraft design and development. An aircraft manufacturer can either select an existing production engine that meets all the performance requirements of the new aircraft design or, if no such production engine exists, the aircraft manufacturer can work with an engine company to develop a new engine design that will meet all the requirements. As used herein, a production engine may be an engine that has been designed, tested, and certified and is in current production by an engine manufacturer. Designing, developing, testing, and certifying a new engine is a very expensive and time consuming process. Thus, aircraft manufacturers prefer to select a production engine (e.g., an "off-the-self" production engine) over investing in a new engine design and development effort.

When developing a new multi-engine airplane, an aircraft manufacturer usually selects a production engine designed with an integrated fan blade containment system (e.g., an integrated, continuous hoop GTEFBC system). Integrated fan blade containment systems are typically formed as a continuous hoop or cylinder (e.g., having a circular cross-section) that wraps around the entire circumference of an aircraft engine. Such known fan blade containment systems provide a lightweight and/or optimal system given that these fan blade containment systems are designed concurrently with the aircraft engine.

However, selecting an aircraft engine with an integrated, continuous hoop GTEFBC system limits the number of production engines that are available for selection and these engines may not be optimal for a new vehicle (e.g. due to limited performance characteristics). As an alternative strategy, an aircraft manufacturer may select an engine that was originally designed without an integrated, continuous hoop GTEFBC system (e.g. an engine originally designed for a single engine airplane) and may request that the engine company redesign the engine to include an integrated, continuous hoop GTEFBC system. However, redesigning an engine to include an integrated blade containment system (e.g., a continuous hoop system) typically requires retesting and recertification of the redesigned engine, which can be exceedingly expensive and may prolong the vehicle development schedule. Thus, redesigning an aircraft engine to include an integrated blade containment system diminishes the cost and the schedule advantages of selecting an existing production engine.

Therefore, in some instances, the best existing production engine selected for a new multi-engine airplane does not have an integrated GTEFBC system (i.e. the engine was originally designed for a single engine plane). Rather than redesign the engine with an integrated GTEFBC system, and then retest, and requalify the engine, the example methods and apparatus disclosed herein provide an economical and effective engine fan blade containment system that may be integrated with the airframe and completely external to the engine.

The example fan blade containment systems disclosed herein are not integrated with the engine. In some examples, example fan blade containment systems disclosed herein do not form a continuous circumferential hoop around the engine. Example fan blade containment systems disclosed herein include a shield, placed between the engine and the surrounding airframe, that is to be coupled to the aircraft structure and that is to at least partially surround a circumference of the aircraft engine. In this example system, an ejected fan blade can escape the engine housing, thus minimizing damage to the engine machinery, but is prevented from escaping the engine bay of the airframe, thus minimizing the risk of damage to adjacent airframe structure, subsystems, weapons, fuel tanks, etc. To save weight and cost, the shield may provide fan blade containment protection only to critical aircraft systems (e.g., partially surround a circumference of an aircraft engine to minimize the weight of example blade containment systems disclosed herein).

Example fan blade containment systems disclosed herein enable an aircraft manufacturer to select an optimal production engine for a new multi-engine aircraft regardless of whether the production engine includes an integrated fan blade containment system. The example fan blade containment systems disclosed herein can be implemented with existing production aircraft engines without requiring retesting and/or recertification of an aircraft engine. In this manner, an aircraft manufacturer avoids costs and/or schedule impact of redesigning, retesting and/or recertifying an engine that was originally designed without an integrated fan blade containment system.

Example fan blade containment systems disclosed herein partially surround a circumference of an aircraft engine. In some such examples, the example fan blade containment systems disclosed herein include a shield or shield body having a first end anchored to a first aircraft structural member (e.g., an aircraft keel) and a second end opposite the first end anchored to a second aircraft structural member. To enable attachment of the shield body to the aircraft structure, the example fan blade containment systems disclosed herein employ connectors positioned at the respective first and second ends of the shield body. For example, an example connector may be a rod, a pin and/or other fastener that may couple with or be anchored to an aircraft structure. For example, the mating connector on the aircraft structure may include a lug hook that is integrally formed with a keel of the aircraft structure. Thus, example connectors of the shield disclosed herein provide mechanical joints for the ends of the shield body and/or the notched, cut-out, or segmented areas of the shield body. In some examples, a coupling or joint between an example shield and an aircraft structure disclosed herein transfers load from a shield body (e.g., a high impact energy absorbing material of the body) to an aircraft structural member (e.g. an aircraft keel, deck or frame).

Example shields of example fan blade containment systems disclosed herein provide adequate clearance to the outer surface of the aircraft engine to provide space for engine bay ventilation, pathways for subsystems routings, and room to allow for routine engine bay maintenance (e.g. without engine or shield removal, etc.). To ensure normal engine operation, the shield should not insulate or restrict airflow around the engine. As used herein, the term "normal operation" means that the aircraft engine operates at temperatures below a threshold maximum engine operating temperature.

Example shields of example fan blade containment systems disclosed herein may be notched, cut-out, and/or a segmented, as needed, to accommodate structural obstacles within the engine bay (e.g. engine mounts). These notches and/or cut-outs, in some instances, may produce discontinuities in the fan blade containment protection provided by the shield. In some examples, the aircraft structure or airframe adjacent to these notched, cut-out, and/or segmented areas (e.g., the areas not covered by the shield body) may be reinforced with a high strength material with the ability to absorb large amounts of kinetic energy (e.g., steel) to accommodate or compensate for the discontinuity in fan blade containment protection provided by the shield body. In some such examples, the aircraft structure and/or airframe adjacent to the notched, cut-out, and/or segmented areas of the shield body may include an increased dimensional characteristic (e.g., a greater thickness). In some such examples, the aircraft structure and/or airframe adjacent to the notched, cut-out, and/or segmented areas of the shield body may include a reinforcement plate (e.g., a metal plate composed of stainless steel) to increase a structural characteristic of the aircraft structure and/or airframe. In some examples, the reinforced areas function similarly to the fan blade containment shield body by preventing fan blade fragments from penetrating through the reinforced areas of the aircraft structure and/or airframe that are exposed adjacent to the notched, cut-out, or segmented portions of a shield body. Thus, a notched, cut-out, and/or segmented shield and an aircraft structure that has been selectively reinforced adjacent to the notched, cut-out, and/or segmented areas of the shield can effectively provide continuous fan blade containment protection.

In some examples, the notched, cut-out, and/or segmented areas of the shield may include a shield termination joint to anchor the notched, cut-out, and/or segmented portions of the shield body to the aircraft structure (e.g., via a pinned lug and clevis joint). Thus, example shield terminations disclosed herein provide mechanical joints for terminating ends of the shield body and/or the notched, cut-out, or segmented areas of the shield body. The example shield terminations disclosed herein may include an integral laminated clevis, a retention pin, and a mating lug hook on the aircraft side. In some examples, example shield termination joints disclosed herein transfer load from the shield body (e.g., a high impact energy absorbing material of the body) to an aircraft structural member (e.g. an aircraft keel, deck or frame).

Example fan blade containment systems disclosed herein may include either a single shield segment or multiple shield segments, depending on the application. Each shield segment may be a unitary body including a first end and a second end opposite the first end. The first end of the example fan blade containment system shield segment may couple to a first aircraft structural member (e.g., a first engine bay keel) and the second end may couple to a second aircraft structural member (e.g., a second engine bay keel). Each shield segment of the example fan blade containment systems disclosed herein may include a kinetic energy absorbing material (e.g., dry Kevlar fibers, dry Kevlar fabric, or any other lightweight, high toughness fiber) that is to prevent high speed fan blade fragments from escaping an engine bay during a fan blade failure event. A first connector (e.g., a shield termination connector) of the example fan blade containment systems disclosed herein may include a first laminated clevis and a first retention pin. The first connector couples the first end of the shield to a first mating coupler (e.g., a first lug hook) on the aircraft structure. A second connector (e.g., a second shield termination connector) of the example fan blade containment systems disclosed herein may include a second laminated clevis and a second retention pin. The second connector couples the second end of the shield to a second mating coupler (e.g., a second lug hook) of the aircraft structure.

FIG. 1 shows a trimetric view of an example aircraft engine 100. The aircraft engine 100 of the illustrated example is an example production gas turbine engine that was originally designed without an integrated fan blade containment system. The aircraft engine 100 of the illustrated example includes a housing 102 that houses an intake fan 104 having fan blades 114 that draw air into the aircraft engine 100.

Figure 2:
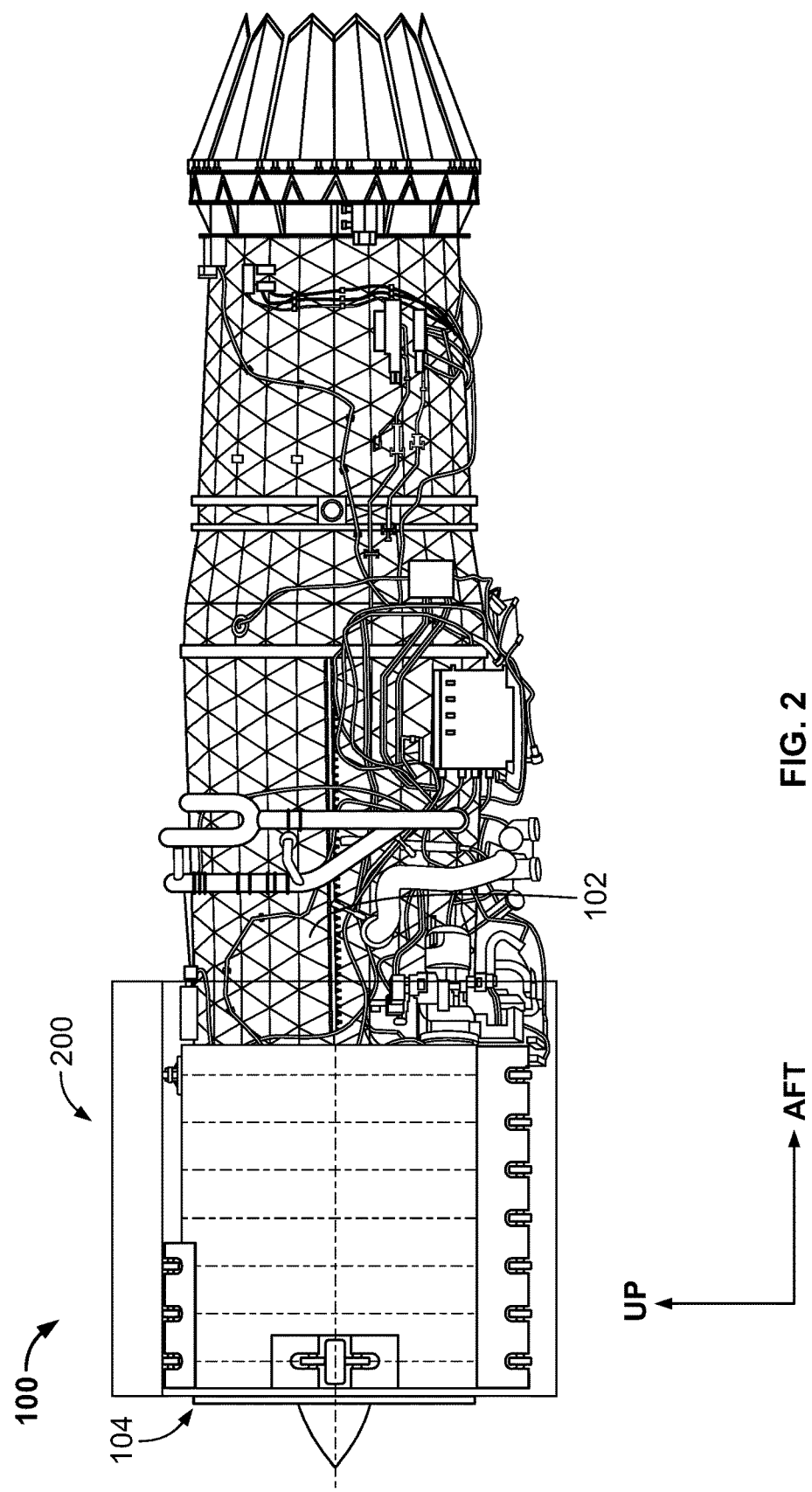
FIG. 2 is a side view of the example aircraft engine of FIG. 1 implemented with an example fan blade containment system in accordance with the teachings of this disclosure.

FIG. 2 is a side view of the aircraft engine 100 of FIG. 1 implemented with an example fan blade containment system 200 constructed in accordance with the teachings of this disclosure. The fan blade containment system 200 of the illustrated example is capable of capturing fragments of the fan blades 114 of the intake fan 102 as a result of fan blade failure.

Figure 3:
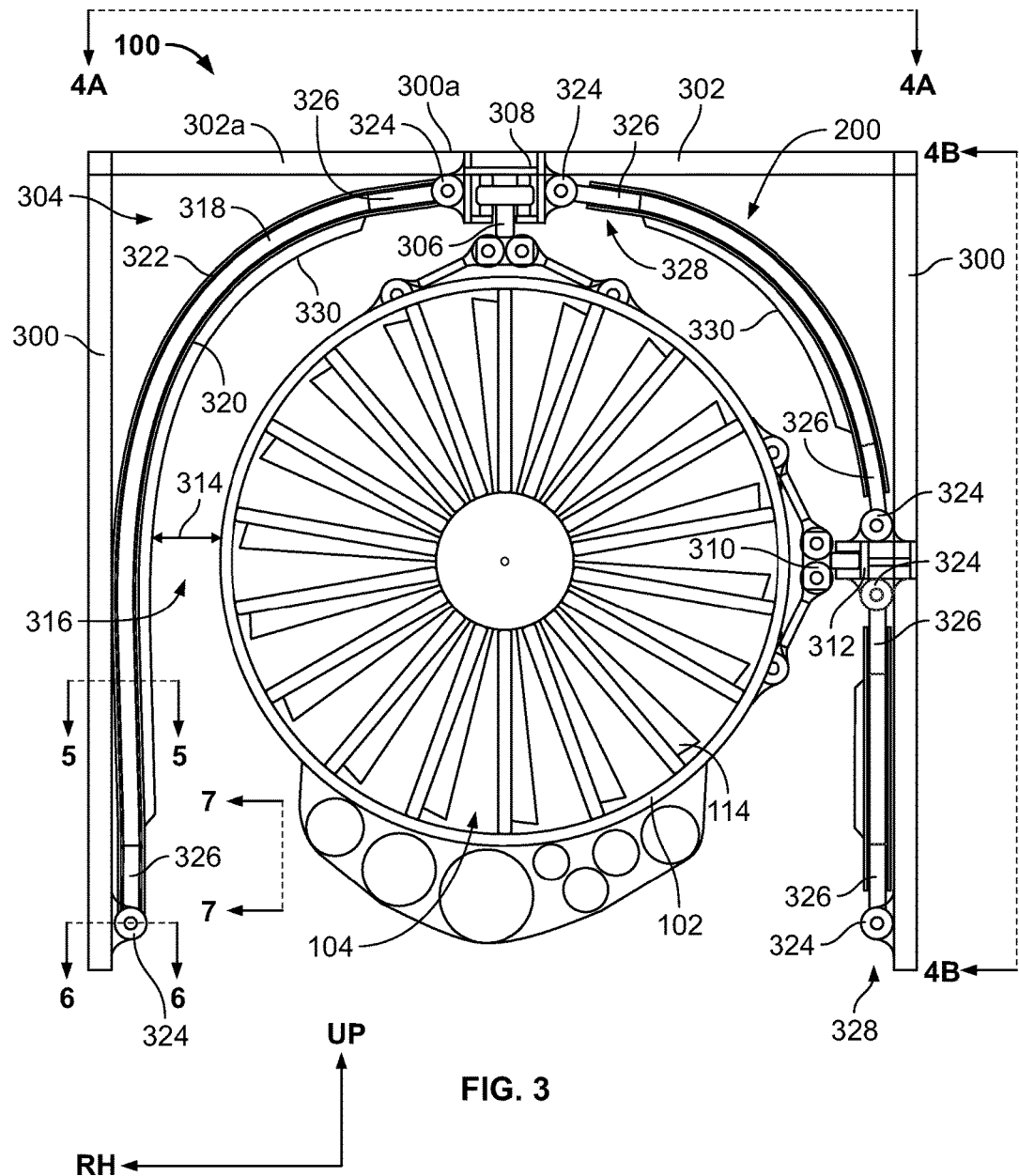
FIG. 3 is a front view of the example aircraft engine and the example fan blade containment system of FIG. 2.

FIG. 3 is a front view of the aircraft engine 100 and the fan blade containment system 200 of FIG. 2. The aircraft engine 100 and the fan blade containment system 200 of the illustrated example are mounted to an aircraft structure 302 of an aircraft 302a. For example, the aircraft engine 100 and the fan blade containment system 200 of the illustrated example are positioned within an engine bay 304 of the aircraft 302a. The engine bay 304 of the illustrated example is formed by engine bay keels 300 and an upper engine bay deck 300a. The aircraft engine 100 of the illustrated example is coupled to an engine mount hanger link fitting 306 via an engine hanger link 308. In some examples, the engine mount hanger link fitting 306 may be manufactured to be integral with or mechanically attached (e.g., fastened) to the upper engine bay deck 300a. In addition, the aircraft engine 100 of the illustrated example is coupled with an engine mount side link fitting 310 via a side link 312. In some examples, the engine mount side link fitting 310 may be manufactured to be integral with or mechanically attached (e.g., fastened) to the engine bay keel 300. The engine hanger link 308 and the side link 312 of the illustrated example are attached to the housing 102 of the aircraft engine 100. Some example aircraft and/or aircraft engine bays may include additional mounting structure(s) and/or mount(s) (e.g., thrust mounts, aft side links, etc.).

The fan blade containment system 200 of the illustrated example is positioned externally relative to the housing 102 of the aircraft engine 100. For example, the fan blade containment system 200 is not directly attached to the housing 102 of the aircraft engine 100 and/or is not positioned inside the housing 102 of the aircraft engine 100. Thus, the fan blade containment system 200 of the illustrated example is not integral with the aircraft engine 100. Although the fan blade containment system 200 of the illustrated example is not integral with the aircraft engine 100, the fan blade containment system 200 of the illustrated example captures fan blade fragments during blade failure, absorbs impact energy from the fan blade fragments, and transfers the energy to the aircraft structure 302.

The fan blade containment system 200 of the illustrated example is coupled (e.g., directly coupled or anchored) to the aircraft structure 302 of the aircraft 302a. When coupled to the aircraft structure 302, the fan blade containment system 200 of the illustrated example is offset or positioned a distance 314 away from the housing 102 of the aircraft engine 100 to provide spacing 316 (e.g., a gap) between (e.g., an inner surface of) the fan blade containment system 200 and (e.g., an outer surface of) the aircraft engine 100. In this manner, the fan blade containment system 200 does not affect the thermal profile and normal operation of the aircraft engine 100. Thus, an aircraft engine such as the aircraft engine 100 of FIG. 1 that is retrofit with the fan blade containment system 200 of the illustrated example does not require re-testing and/or re-certification because the fan blade containment system 200 does not affect the normal operation of the aircraft engine 100.

Additionally, because the fan blade containment system 200 of the illustrated example is coupled externally relative to the aircraft engine 100, the spacing 316 between the fan blade containment system 200 of the illustrated example and the aircraft engine 100 enables access to the aircraft engine 100 (e.g., engine system routings) and/or the engine bay 304 without having to remove the fan blade containment system 200 (e.g., during routine maintenance of the aircraft engine 100). For example, the fan blade containment system 200 of the illustrated example may be shaped or positioned to provide convenient access to components of the aircraft engine 100 and/or the engine bay 304 of the aircraft 302a.

In some examples, the fan blade containment system 200 of the illustrated example may be replaced with a different fan blade containment system composed of different material(s) (e.g., a lower weight and/or higher strength material(s)). As described in greater detail below, the fan blade containment system 200 of the illustrated example may be formed with varying dimensions and/or volumes, varying material(s) composition, and/or shape to improve performance (e.g., energy absorption) characteristic(s).

The fan blade containment system 200 of the illustrated example at least partially surrounds a circumference of the aircraft engine 100 (e.g., the fan blades 114 of the intake fan 104). In the illustrated example, the fan blade containment system 200 of the illustrated example surrounds a portion of a circumference of the aircraft engine 100 while leaving another portion of the circumference of the aircraft engine 100 uncovered (e.g., exposed). For example, as shown in FIG. 3, the fan blade containment system 200 is positioned around partial areas of the aircraft engine 100 (e.g., lateral sides and a top side of the aircraft engine 100) and other non-critical areas are uncovered (e.g., a bottom side of the aircraft engine 100). A bottom side of the aircraft engine 100, for example, may be a non-critical area because blade fragments that may pierce the engine bay 304 eject in a downward direction during flight and away from other components (e.g., critical components such as weapons, fuel, etc.) of the aircraft 302a. Additionally, providing the fan blade containment system 200 around only a portion (e.g., the critical areas with high probability trajectories) of the aircraft engine 100 reduces weight of the fan blade containment system 200, thereby improving aircraft performance (e.g., fuel efficiency). However, in some examples, the fan blade containment system 200 (e.g., the shield) may be positioned to surround (e.g., encase) the entire circumference of the aircraft engine 100. To enable the fan blade containment system 200 to surround an entire circumference of the aircraft engine 100, the fan blade containment system 200 may include a portion (e.g., a segment) extending underneath the aircraft engine 100 and coupled to another airframe structure (e.g. an engine bay lower cover panel) positioned underneath the aircraft engine 100. To facilitate engine bay access, the lower segment of the shield can be integrated with the lower engine bay cover and can be designed to be removed/installed with the cover during engine bay maintenance activities.

To capture and/or absorb impact energy of fan blade fragments, the fan blade containment system 200 of the illustrated example includes a shield 318. The shield 318 of the illustrated example is positioned around at least a portion of the aircraft engine 100. The shield 318 of the illustrated example includes a first face or impact face 320 oriented or facing toward the housing 102 of the aircraft engine 100 and a second face or outer face 322 oriented or facing away from the housing 102 of the aircraft engine 100.

To couple (e.g., anchor or fix) the shield 318 to the aircraft structure 302, the shield 318 of the illustrated example includes a shield termination connector 324 at each end 326 of the shield 318. In the illustrated example, each end 326 of the shield 318 is defined as a portion of the shield 318 that is to couple to the aircraft structure 302. Specifically, the shield termination connector 324 and the aircraft structure 302 of the illustrated example form one or more joints 328 (e.g. high strength joints) when the shield 318 is coupled to the aircraft structure 302. The joints 328 provide a load path to transfer the fan blade impact energy from the shield 318 to the aircraft structure 302. During an impact event, the shield 318 of the illustrated example may flex or stretch when fan blade fragments impact the shield 318. The joints 328 of the illustrated example retain or capture the ends 326 of the shield 318 and prevent the ends 326 from decoupling from the aircraft structure 302 during an impact event (e.g., when the shield 318 deflects relative to the ends 326).

To minimize these deflections and to enable the shield 318 to maintain its shape when the aircraft 302a performs flight maneuvers, the shield 318 of the illustrated example includes one or more stiffeners 330. The stiffeners 330 of the illustrated example are attached to the impact face 320 of the shield 318. In the illustrated example, respective ends of the stiffeners 330 terminate prior to reaching the ends 326 of the shield 318. The stiffeners 330 of the illustrated example may be machined, formed (e.g., pre-formed) and/or otherwise have a profile (e.g., a contoured profile) substantially similar (e.g., identical) to the shape of the shield 318 portion or segment to which the stiffeners 330 are attached. For example, the stiffeners 330 of the illustrated example have a curved or arcuate shape or profile similar to the arcuate shape or profile of the shield 318. The stiffeners 330 may be formed of aluminum, carbon//epoxy composite and/or any other suitable material(s).

Figure 4A:
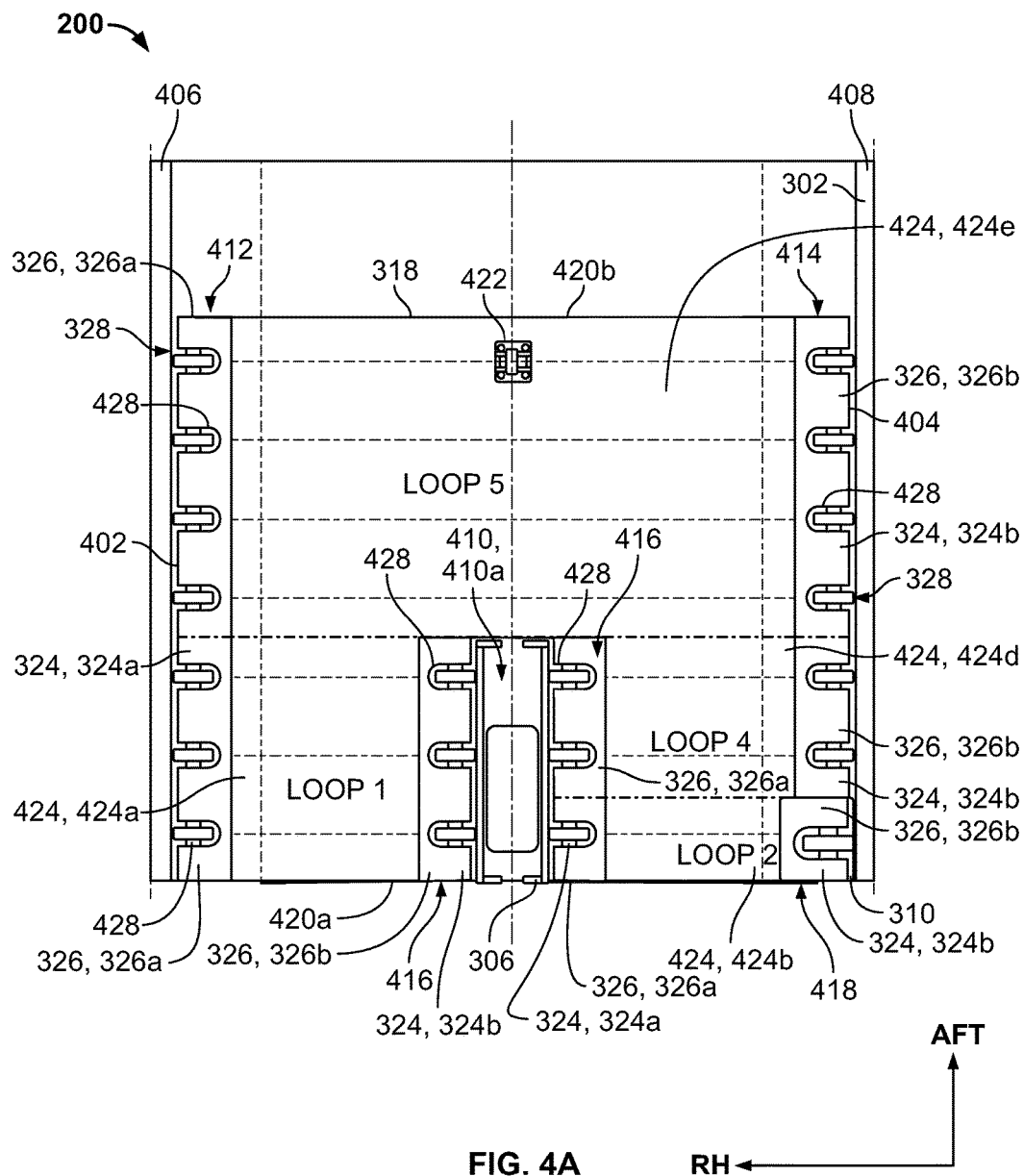
FIG. 4A is a top view of the example aircraft engine and fan blade containment system taken along line 4A-4A of FIG. 3.
Figure 4B:
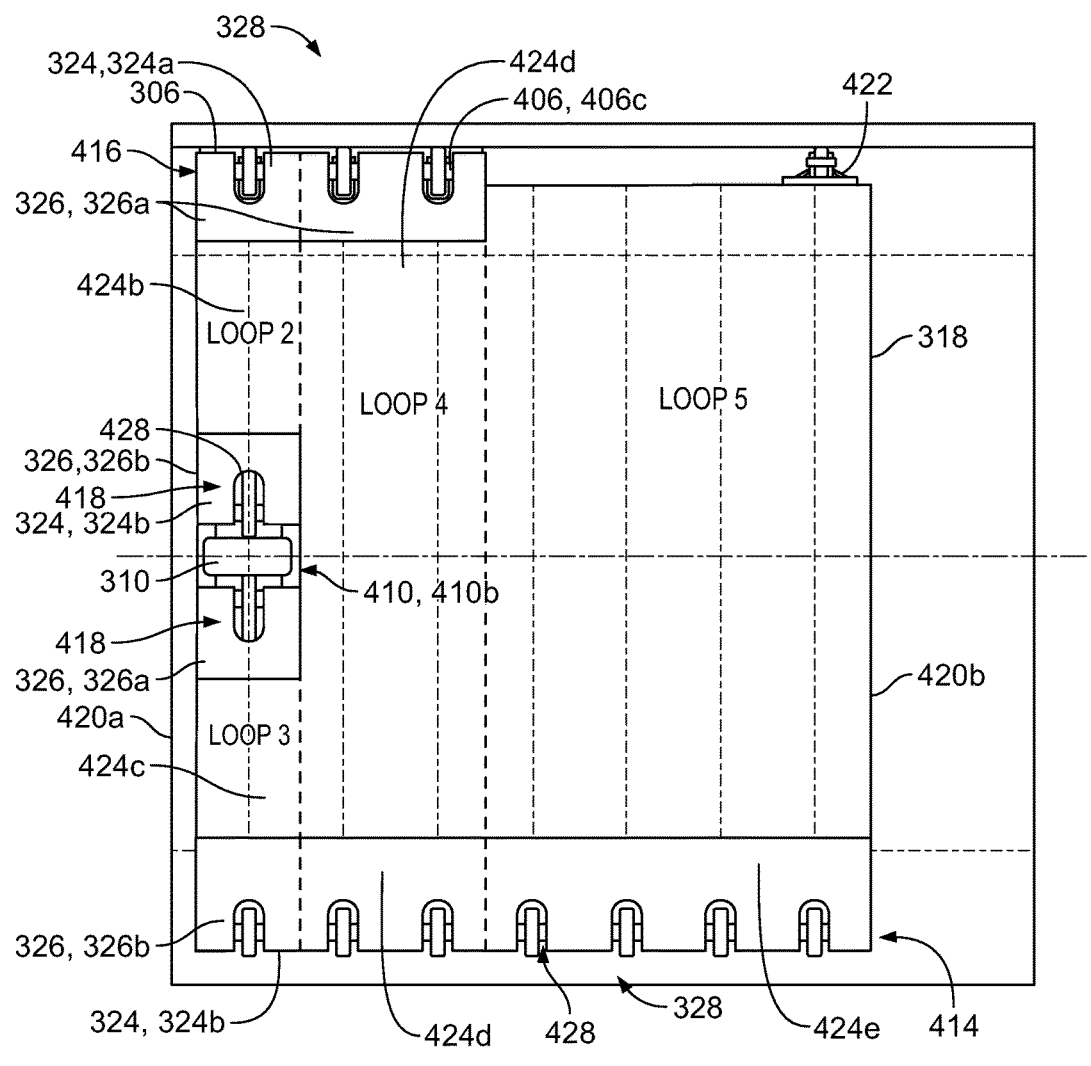
FIG. 4B is a side view of the example aircraft engine and fan blade containment system taken along line 4B-4B of FIG. 3.
Figure 4B:
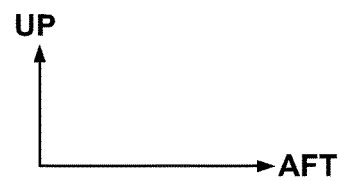

FIG. 4A is a top view of the fan blade containment system 200 of FIGS. 2 and 3. FIG. 4B is a side view of the fan blade containment system 200 of FIGS. 2, 3 and 4A. The aircraft engine 100 is omitted from FIGS. 4A and 4B for clarity. Referring to FIGS. 4A and 4B, the shield 318 of the illustrated example includes a first end 402 and a second end 404 opposite the first end 402. The first end 402 of the illustrated example is coupled to a first engine bay keel 406 (e.g., a frame or deck) of the aircraft structure 302 and the second end 404 is coupled to a second engine bay keel 408 (e.g., a frame or deck) of the aircraft structure 302. To enable the shield 318 to fit around structural elements or structural obstacles of the aircraft structure 302, the shield 318 of the illustrated example includes one or more cut-out or notched openings 410. For example, the shield 318 of the illustrated example includes a first notched opening 410a (FIG. 4A) adjacent to the engine mount hanger link fitting 306 and a second notched opening 410 (FIG. 4B) adjacent to the engine mount side link fitting 310 to enable the shield 318 to fit around the engine hanger link 308 and the side link 312. The first end 402, the second end 404, and/or the openings 410 may form the terminating ends 326 of the shield 318.

In some examples, the aircraft structure 302 may be reinforced (e.g., hardened) to provide fan blade containment in areas of the aircraft structure 302 that are exposed by the one or more notched openings 410 of the shield 318 (i.e., not covered by the shield 318). The reinforced and/or hardened aircraft structure 302 exposed adjacent the one or more notched openings 410 compensates for the discontinuity in the shield 318 of the fan blade containment system 200 and prevents a fan blade fragment from piercing through the aircraft structure 302 exposed by the one or more notched openings 410. To reinforce the aircraft structure 302 (e.g., exposed by the notched openings 410), the aircraft structure 302 may be reinforced with (e.g., composed of) high strength material(s) (e.g. titanium, stainless steel, Inconel, etc.) and/or provided with a thickness increase (e.g., an increased thickness compared to portions of the aircraft structure 302 that are covered by the shield 318). For example, portions of the aircraft structure 302 adjacent to the one or more notched openings 410 (e.g., exposed portions of the aircraft structure 302) may include one or more plates (e.g., stacked plates) composed of high strength material(s) that may be attached or coupled to the aircraft structure 302 adjacent to the one or more opening 410 to reinforce the aircraft structure 302. For example, (e.g., at least a portion of) the upper engine bay deck 300a and/or the engine mount hanger link fitting 306 may be reinforced with (e.g., composed of) high strength material(s) (e.g. titanium, stainless steel, Inconel, etc.) and/or provided with a thickness (e.g., an increased thickness) to reinforce the aircraft structure 302 adjacent to (e.g., exposed by) the first notched opening 410a. For example, one or more plates (e.g., stacked plates)

composed of high strength material(s) may be attached or coupled to the upper engine bay deck 300a and/or the engine mount hanger link fitting 306 exposed adjacent to the first notched opening 410a to increase a thickness of the aircraft structure 302 adjacent to (e.g., exposed by) the first notched opening 410a. Likewise, (e.g., at least a portion of) the engine bay keel 300 and/or the engine mount side link fitting 310 positioned (e.g., exposed) adjacent to the second notched opening 410b may also be composed of high strength material(s) (e.g. titanium, stainless steel, Inconel, etc.) and/or provided with an increased thickness to reinforce the aircraft structure 302 exposed by the second notched opening 410b. In some examples, one or more plates may be coupled or attached to the engine bay keel 300 and/or the engine mount side link fitting 310 exposed adjacent to the second notched opening 410b to increase the thickness of the aircraft structure 302 exposed by the second notched opening 410b.

The first end 402 of the shield 318 of the illustrated example has a first plurality 412 of the shield termination connectors 324 and the second end 404 opposite the first end 402 has a second plurality 414 of the shield termination connectors 324. The first plurality 412 of the shield termination connectors 324 couple (e.g., anchor) the shield 318 to the first engine bay keel 406 and the second plurality 414 of the shield termination connectors 324 couple (e.g., anchor) the second end 404 of the shield 318 to the second engine bay keel 408. The shield 318 includes a third plurality 416 of the shield termination connectors 324 to couple (e.g., anchor) the shield 318 to the engine mount hanger link fitting 306 and a fourth plurality 418 of the shield termination connectors 324 to couple (e.g., anchor) the shield 318 to the engine mount side link fitting 310. In some examples, a front edge 420a and/or a rear edge 420b of the shield 318 may also include the shield termination connectors 324 to couple (e.g., anchor) the front edge 420a and/or the rear edge 420b to the aircraft structure 302. Additionally, the shield 318 of the illustrated example includes one or more body couplers 422 that couple the shield 318 to the aircraft structure 302. The body couplers 422 help support the weight of the shield 318 and transfer inertial loads of the shield 318 to the aircraft structure 302. However, in some examples, the body couplers 422 may not be used.

The shield 318 of the illustrated example has a unitary body between the first end 402 and the second end 404. However, in some examples, the shield 318 may include a plurality of shields or shield segments. For example, the engine mount hanger link fitting 306 and/or the engine mount side link fitting 310 may extend between the front edge 420a and the rear edge 420b (e.g., an entire width of the shield 318 between the front edge 420a and the rear edge 420b). In some such examples, the shield 318 of the illustrated example may include a first shield segment having first and second ends (e.g., terminating ends) coupled to the first engine bay keel 406 and the engine mount hanger link fitting 306 extending between the front edge 420a and the rear edge 420b. In some such examples, the shield 318 may include a second shield segment having first and second ends (e.g., terminating ends) coupled to the engine mount hanger link fitting 306 and the engine mount side link fitting 310 extending between the front edge 420a and the rear edge 420b. In some such examples, the shield 318 may include a third shield segment having first and second ends (e.g., terminating ends) coupled to the engine mount side link fitting 310 extending between the front edge 420a and the rear edge 420b and the second engine bay keel 408. Each of the respective first and second ends of the shield segments may include the shield termination connectors 324 to couple the respective first and second ends to the aircraft structure 302. As described below in connection with FIG. 5, the shield 318 of the illustrated example may include a plurality of closed or fibrous loops 424 (e.g., loops 424a-e) and small access cut-outs 428 (e.g., "mouse-hole" shaped cut-outs, slits, openings, etc.).

Figure 5:
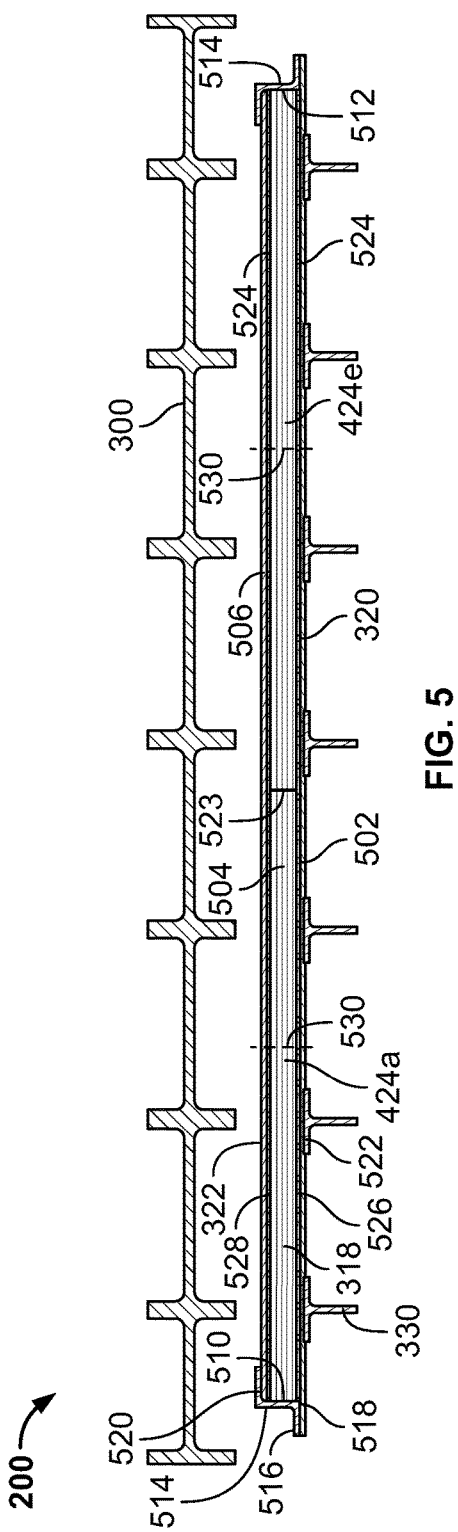
FIG. 5 is a cross-sectional view of the example fan blade containment system taken along line 5-5 of FIG. 3.

FIG. 5 is a cross-sectional view of the fan blade containment system 200 taken along line 5-5 of FIG. 3. In the illustrated example, the shield 318 is a multi-layer shield. The shield 318 of the illustrated example includes a first layer 502 (e.g., an inner layer), a second layer 504 (e.g. middle layer), and a third layer 506 (e.g., an outer layer). The first layer 502 of the illustrated example defines the impact face 320 of the shield 318 and the third layer 506 of the illustrated example defines the outer face 322 of the shield 318. To surround the aircraft engine 100, the first layer 502, the second layer 504 and/or the third layer 506 may be shaped with an arcuate profile such as, for example, a profile of the shield 318 (e.g., the impact face 320 and the outer face 322) shown in FIG. 3.

The first layer 502 of the shield 318 of the illustrated example provides a first resistance to the fan blade fragments during a fan blade failure. For example, the first layer 502 of the illustrated example blunts edges of the fan blade fragments prior to fan blade fragments impacting the second layer 504. The first layer 502 of the illustrated example is a sheet or plate composed of a high strength material such as, for example, steel (e.g., stainless steel, Inconel, etc.), titanium and/or any other suitable material(s).

In the illustrated example, the second layer 504 is an impact absorbing layer that captures or absorbs impact energy (e.g., kinetic energy) from fan blade fragments to prevent or restrict penetration of the fan blade fragments to the third layer 506. The second layer 504 may restrict penetration of the fan blade fragments by significantly reducing a velocity and/or force of the fan blade fragments prior to the fan blade fragments reaching the third layer 506. In some examples, the second layer 504 may prevent penetration of the fan blade fragments from reaching the third layer 506. In some examples, if a fan blade fragment penetrates the second layer 504 and reaches the third layer 506, the energy of the fan blade fragment is reduced significantly such that the fan blade fragment cannot exit the third layer 506 and/or cannot damage surrounding components of the aircraft 302a should the fan blade fragment exit the third layer 506.

The second layer 504 of the illustrated example may be composed of a light weight, high impact energy absorbing material such as, for example, Kevlar (e.g., Kevlar fabric, dry Kevlar fibers, etc.). For example, the second layer 504 of the illustrated example includes multiple plies of dry Kevlar fabric, cloth, or a braided Kevlar fiber weave. In some examples, the second layer 504 may be dry Kevlar fibers that may be woven or braided to form the second layer 504 of the shield 318. The Kevlar fabric/weave may include interconnected fibers that form a lattice pattern. For example, a first set of fibers may be positioned substantially perpendicular (e.g., non-parallel) relative to a second set of fibers. In some examples, to increase the strength of the second layer 504, a thickness of the second layer 504 may be increased. For example, a thicker Kevlar fiber weave or a plurality of Kevlar cloth plies may be stacked to define the second layer 504.

The third layer 506 of the illustrated example provides backing/support to the second layer 504. The third layer 506 of the illustrated example is a plate or sheet composed of a lighter weight material compared to the first layer 502. For example, the third layer 506 of the illustrated example is composed of aluminum. In some examples, the third layer 506 may be composed of composite material(s) such as, for example, a Kevlar/epoxy laminate, a carbon/epoxy laminate, etc. Given that the first layer 502 provides impact resistance and the second layer 504 absorbs a substantial portion of the impact energy, the third layer 506 may be composed of a lighter material to reduce weight of the fan blade containment system 200. However, in some examples, the third layer 506 may be composed of high strength material (e.g., stainless steel) similar to the first layer 502 to provide an additional barrier to fan blade fragments that may pass through the second layer 504. Thus, in some examples, the third layer 506 may be composed of the same material as the first layer 502. In some examples, the third layer 506 is composed of a material (e.g., aluminum, titanium, etc.) that is different than the material of the first layer 502 (e.g. steel). In some examples, to increase the strength of the third layer 506, a thickness of the third layer 506 may be increased. For example, a thicker aluminum sheet or a plurality of aluminum sheets may be stacked to define the third layer 506.

Referring also to FIGS. 4A & 4B, the second layer 504 of the shield 318 may include or form the plurality of fibrous loops 424. The fibrous loops 424 of the illustrated example are fabricated by wrapping dry Kevlar fabric or braiding/weaving dry Kevlar fibers into a continuous cylinder, hoop, or any other closed loop shape that has a thickness equal to half the desired thickness of the second layer 504. In particular, the fibrous loops 424 of the illustrated example form a continuous Kevlar cylinder, hoop, or closed loop shape that are then flattened or collapsed and contoured into the shape of the shield 318, such that opposite walls of the Kevlar cylinder, hoop, or closed loop shape come in contact and can be stitched together in the thickness direction to form the respective one of the fibrous loops 424a-e. Each fibrous loop 424 of the illustrated example is stitched such that a cylindrical opening or sleeve (e.g., a laminated clevis 606 of FIG. 6) at each end 326 is formed to receive or accommodate the insertion of a high strength (e.g. steel) retention rod (e.g., the retention rod 608 of FIG. 6), used for anchoring the energy absorbing second layer 504 to the aircraft structure 302. For optimal shield strength, the direction of the continuous Kevlar fibers is oriented in the circumferential direction of the shield (i.e. the retention rods run parallel to the fore-aft axis of the engine). To reinforce the ends 326 of the fibrous loops 424, the dry fiber can be impregnated with an epoxy resin (or any other suitable polymeric resin) to form a Kevlar/epoxy laminated clevis (e.g., the laminated clevis 606 of FIG. 6). To access the retention rod, the small access cut-outs 428 (e.g., "mouse hole" shaped cut-outs) can be machined into the laminated clevis ends of the fibrous loops 424. Each shield termination connector 324 includes the laminated clevis (e.g., the laminated clevis 606 of FIG. 6) of a respective one of the fibrous loops 424 and a retention rod (e.g., the retention rod 608 of FIG. 6) that is accessed through the small access cut-outs 428 (e.g., the mouse hole cut-out). The shield termination connector 324, the laminated clevis, and the retention rod are discussed in greater detail in connection with FIG. 6.

Multiple fibrous loops (e.g. dry Kevlar fabric loops, braided dry Kevlar fiber loops, etc.) enable the shield 318 to be notched to fit around structural elements or structural obstacles of the aircraft structure 302 while maintaining structural integrity in the circumferential direction (i.e. hoop strength). For example, the shield 318 of the illustrated example includes a first fibrous loop 424a (FIG. 4A), a second fibrous loop 424b, a third fibrous loop 424c, a fourth fibrous loop 424d, and a fifth fibrous loop 424e. For example, the first fibrous loop 424a is coupled to a first engine bay keel 406 (e.g., a frame or deck) of the aircraft structure 302 and the engine mount hanger link fitting 306, the second fibrous loop 424b is coupled to the engine mount hanger link fitting 306 and the engine mount side link fitting 310, the third fibrous loop 424c (FIG. 4B) is coupled to the engine mount side link fitting 310 and a second engine bay keel 404b (e.g., a frame or deck), the fourth fibrous loop 424d is coupled to the engine mount hanger link fitting 306 and the second engine bay keel 408, and the fifth fibrous loop 424e is coupled to the first engine bay keel 406 and the second engine bay keel 408. To form a continuous second layer 504, each fibrous loop 424 is stitched to a neighboring/adjacent fibrous loop 424. In some examples, the shield 318 of the illustrated does not require any large cut-outs or notches and the second layer 504 may be formed as a unitary body.

Each fibrous loop 424a-e of the illustrated example includes a first end 326a (e.g., a respective one of the ends 326) having a shield termination connector 324a and a second end 326b (e.g., a respective one of the ends 326) having a second shield termination connector 324. Each of the fibrous loops 424 may have different dimensional characteristic(s) (e.g., fore-aft lengths and circumferential widths) to fit around elements of the aircraft structure 302. For example, the first fibrous loop 424a of the illustrated example of FIG. 4A includes a forward-aft length that is substantially similar to the fore-aft length of the engine mount hanger link fitting 306. The second fibrous loop 424b and the third fibrous loop 424c of the illustrated example of FIGS. 4A and 4B each have a forward-aft length that is substantially similar to the fore-aft length of the engine mount side link fitting 310. The fourth fibrous loop 424d of the illustrated example of FIGS. 4A and 4B has a forward-aft length that is substantially similar to the difference between the fore-aft length of the engine mount hanger link fitting 306 and the fore-aft length of the engine mount side link fitting 310. The fifth fibrous loop 424e of the illustrated example of FIGS. 4A and 4B includes a forward-aft length that is substantially similar to the fore-aft length between the rear edge 420b and the aft end of the engine mount hanger link fitting 306. Additionally, the fibrous loops 424 may have different circumferential widths to accommodate different structural elements of the aircraft structure 302. The fibrous loops 424a-d have circumferential widths that are smaller than the circumferential width of the fifth shield portion 424e.

As noted above, only a notched shield requires that the second layer be divided into fibrous loops. To form the notched shield 318 as a unitary body, the first layer 502 of the shield 318 may be formed as a notched, unitary body and the third layer 506 of the shield 318 may be formed as a separate notched, unitary body. To form the second layer 504 as a unitary body, the fibrous loops 424a-e of the illustrated example are coupled or spliced together attached via stitches 523 and/or any other method of splicing dry Kevlar fabric or dry Kevlar fibers. For example, the fibrous loops 424a-e (e.g., formed from a dry Kevlar fabric or dry Kevlar fibers) may be spliced or stitched together to form a unitary second layer 504 of the notched shield 318. During a fan blade impact event, a majority of the membrane loads induced in the second layer 504 of the shield 318 are transmitted in the circumferential direction, from the impact site to the nearest shield termination connector 324. The membrane loads in the fore-aft direction are much less, therefore, splicing the second layer 504 in the fore-aft direction should produce a structurally acceptable solution.

A forward edge 510 and/or an aft edge 512 of the shield 318 of the illustrated example include close-out stiffeners 514 (e.g., Z-shaped stiffeners, etc.) to maintain a shape of the shield 318 and/or to cover or seal (e.g., protect) the second (e.g. dry Kevlar fiber) layer 504 from the engine bay 304 environment (e.g., elevated temperatures, moisture, engine oil, JP-8 fuel, etc.). The Z-shaped stiffeners 514 may be attached to the first layer 502 and/or the third layer 506 via mechanical fasteners (e.g., rivets), adhesive (e.g., epoxy, rubber sealant, etc.), spot welds, and/or any other fastening method(s). For example, a first flange 516 of the Z-shaped stiffeners 514 may be attached to an inner surface 518 of the impact face 320 and/or the first layer 502 and a second flange 520 of the Z-shaped stiffeners 514 may be attached to the outer face 322 of the third layer 506. For example, the Z-shaped stiffeners 514 may be attached to the first layer 502 and/or the third layer 506 (e.g., to the inner surface 518 of the impact face 320 and the outer face 322) via protruding head blind rivets, adhesive and/or any other fastening method(s). The Z-shaped stiffeners 514 of the illustrated example extend an entire length of the forward edge 510 and an entire length of the aft edge 512, respectively. However, in some examples, the Z-shaped stiffeners 514 may extend along only a portion of the length of the forward edge 510 and/or the aft edge 512.

As noted above, the shield 318 of the illustrated example also includes multiple circumferential panel stiffeners 330 (e.g., T-shaped stiffeners). The T-shaped stiffeners 330 of the illustrated example include a face 522 (e.g., a flange) to couple the T-shaped stiffeners 330 to the first layer 502. For example, the T-shaped stiffeners 330 of the illustrated example may be attached to the impact face 320 of the first layer 502 via mechanical fasteners (e.g., protruding head blind rivets, screws, etc.), adhesive (e.g., epoxy, rubber sealant, etc.), spot welds, and/or any other fastening method(s).

To couple the first layer 502 and the second layer 504 and/or the third layer 506 and the second layer 504, the fan blade containment system 200 of the illustrated example employs an adhesive 524 (e.g., an adhesive bondline). The adhesive 524 may be a rubber adhesive, a rubber sealant (e.g. polysulfide), and/or any other suitable bonding agent. For example, the shield 318 of the illustrated example includes a first adhesive layer 526 between the first layer 502 and the second layer 504, and a second adhesive layer 528 between the second layer 504 and the third layer 506. Because the second layer includes multiple dry Kevlar fabric and/or braided Kevlar fiber plies, the plies of the illustrated example are stitched together to enable the second layer to behave as one cohesive entity. The first adhesive layer 526 couples (e.g., bonds) the first layer 502 and the second layer 504, and the second adhesive layer 528 couples (e.g., bonds) the third layer 506 and the second layer 504. For example, the adhesive 524 may be employed to enable the second layer 504, composed of dry Kevlar fibers, to bond or attach to the first layer 502, composed of stainless steel, and/or the third layer 506, composed of aluminum and/or stainless steel.

In some examples, to add rigidity to the shield and to ensure that the first layer 502 engages (e.g. directly contacts or tightly presses up against) the second layer 504 and that the second layer engages (e.g., directly contacts or tightly press up against) the third layer 506, the shield 318 of the illustrated example includes one or more intermediate fasteners 530 (e.g., blind rivets, bolts and nuts). The intermediate fasteners 530 may pass through at least portions of the first layer 502, the second layer 504 and/or the third layer 506. In some examples, the shield 318 may not include the Z-shaped stiffeners 514, the T-shaped stiffeners 330, the first adhesive layer 526, the second adhesive layer 528, the stitches 523 and/or the intermediate fasteners 530.

Figure 6:
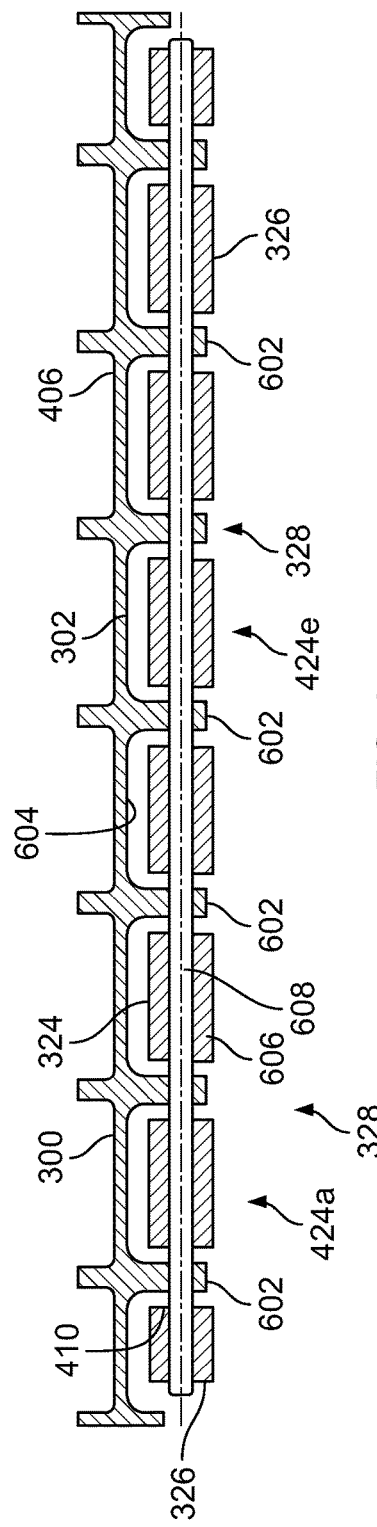
FIG. 6 is a cross-sectional view of the example fan blade containment system taken along line 6-6 of FIG. 3.

FIG. 6 is a cross-sectional view of the fan blade containment system 200 taken along line 6-6 of FIG. 3. In the illustrated example, to couple the shield 318 to the aircraft structure 302, the aircraft structure 302 of the illustrated example employs one or more lug hooks 602. For example, the lug hooks 602 of the illustrated example are integrally formed with the aircraft structure 302. For example, FIG. 6 illustrates the lug hooks 602 formed with the first engine bay keel 406. The lug hooks 602 of the second engine bay keel 408, the engine mount hanger link fitting 306 and/or the engine mount side link fitting 310 are similar to the lug hooks 602 of the first engine bay keel 406 shown in FIG. 6. The lug hooks 602 protrude from a surface or face 604 of the aircraft structure 302 (e.g., the first engine keel 404a as shown in FIG. 6).

The lug hooks 602 of the illustrated example are configured to receive the shield termination connectors 324, which includes a laminated clevis 606 (e.g., a sleeve) and a retention rod 608 (e.g., positioned in or received by the laminated clevis 606) at the ends 326 of the shield 318 to provide the joints 328 (e.g., a lug hook and laminated clevis pinned joint). The joints 328 of the illustrated example provide a load path from the shield 318 to the aircraft structure 302. The lug hooks 602 of the illustrated example are formed with the aircraft structure 302 and are coupled with the retention rod 608 of the shield termination connector 324. In operation, during a fan blade impact event, for example, membrane loads transfer loads from the second layer 504 of the shield 318 to the laminated devises 606 and retention rods 608 of the shield termination connectors 324 and then to the mating lug hooks 602 of the aircraft structure 302. During a fan blade impact event, at least a portion of the shield 318 of the illustrated example may deflect or bend (e.g., expands) when the shield 318 absorbs impact energy from the fan blade fragments while the shield termination connectors 324 and the joints 328 (e.g., a lug hook and laminated clevis pinned joint, including the lug hook 602, the laminated clevis 606, and the retention rod 608) maintain the shield 318 anchored to the aircraft structure 302. The shield 318 of the illustrated example prevents or restricts the fan blade fragments from exiting the engine bay 304. The joints 328 provide a load path to enable the transfer of forces absorbed by the shield 318 to the aircraft structure 302. Thus, relatively high, transient membrane loads generated in the shield 318 by the fan blade fragments may be effectively transferred to the joints 328 and reacted by the aircraft structure 302. Further, during an impact event, the joints 328 provide sufficient holding force to prevent the ends 326 of the shield 318 from decoupling from the aircraft structure 302.

Figure 7:
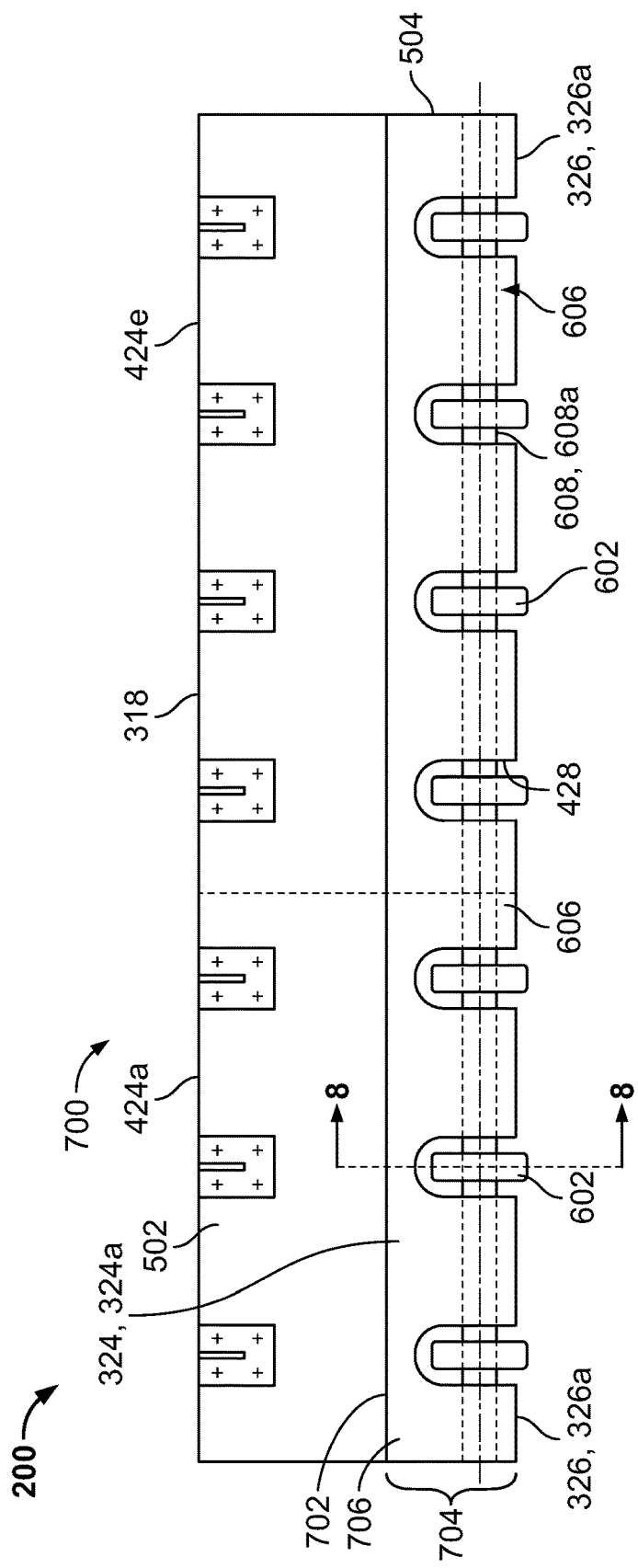
FIG. 7 is a close-up side view of the fan blade containment shield of the example fan blade containment system taken along line 7-7 of FIG. 3.

FIG. 7 is a close-up side view of a portion 700 of the shield 318 of FIGS. 2, 3, 4A and 4B taken along line 7-7 of FIG. 3. The portion 700 of the illustrated example is a first terminating end 326a of the shield 318 having shield termination connectors 324a (e.g., integral with the shield 318). The portion 700 of the illustrated example can be implemented at the first end 402, the second end 404, the one or more notched openings 410, and/or any other portion of the shield 318 defining a terminating end (e.g., the terminating ends 326) of the shield 318 having one or more of the shield termination connectors 324 that couple or attach to the aircraft structure 302 (e.g. the lug hooks 602).

To form the shield termination connectors 324, the end 326 of the shield 318 extends from an end 702 of the first layer 502 (e.g., and/or the third layer 506). In other words, at least a portion 704 of the second layer 504 extends or protrudes from the end 702 of the first layer 502 (e.g., and/or the third layer 506) to couple or attach to the lug hooks 602 via the laminated clevis 606 and the retention rod 608.

To enable the second layer 504 of the illustrated example to couple to the lug hooks 602 and transfer loads from the shield 318 to the lug hooks 602, at least the portion 704 of the ends 326 of the second layer 504 of the illustrated example includes a reinforced end 706. The reinforced end 706 of the illustrated example is integrally formed with and/or attached to the second layer 504. In other words, the reinforced end 706 of the illustrated example is unitary (e.g., integral) with the second layer 504. The reinforced end 706 of the illustrated example increases strength characteristic(s) of the ends 326 to enable the shield 318 to couple to the lug hooks 602 via the retention rod 608. For example, the reinforced end 706 of the illustrated example provides the laminated clevis 606 (e.g., integrally formed with the second layer 504) at the ends 326 of the shield 318 that receives the retention rod 608. Each of the joints 328 of the illustrated example is a pinned hook lug and laminated clevis joint (e.g., a pinned lug and clevis fastening system). The reinforced end 706 of the illustrated example is a composite laminate. Because the retention rods 608 transfer high loads from the laminated clevises 606 to the lug hooks 602, the retention rods 608 can be made of a high strength material (e.g. titanium 6Al-4V, Ph13-8Mo stainless steel, Inconel 718, etc.), The reinforced end 706 of the illustrated example may be formed by impregnating the ends 326 of the second layer 504 with an epoxy resin (or any other suitable polymeric resin). For example, the ends 326 of the shield 318 (e.g., formed from the second layer 504 composed of a Kevlar fabric, braid, etc.) may be impregnated with epoxy to form the laminated clevis 606 (e.g., an integral laminated clevis). The ends 326 of the second layer 504 may be impregnated with an epoxy resin via a resin transfer molding (RTM), a vacuum assisted resin transfer molding (VARTM), a resin film infusion (RFI) process, and/or any other suitable polymer matrix composite manufacturing process(es) or technique(s). To form the laminated devises 606 of the shield termination connectors 324, the retention rod 608 can be release coated and used as an inner tool during the composite laminate molding process. The epoxy resin may then be cured. Once cured, the epoxy resin and the dry Kevlar fibers of the second layer 504 form the composite laminate having relatively high strength and stiffness characteristics.

After molding, the retention rod 608 can be removed from clevis cavity and the small, "mouse hole" shaped, access cut-outs 428 can be machined into the reinforced end 706 of the shield to form the discrete laminated devises 606 of the shield termination connectors 324. The mouse hole shaped cut-outs 428 are aligned with the lug hooks 602 of the aircraft structure 302 and allow the lug hooks 602 to engage directly with the retention rod 608. To form the shield termination connectors 324, the retention rod 608 is inserted (e.g., re-inserted) in the cavity of the laminated devises 606. Once fully inserted, the retention rod 608 can be prevented from moving relative to the laminated devises 606 (i.e. slipping out) by either bonding (e.g. via an adhesive bond) or mechanically attaching (e.g. via cotter pins, fasteners) the retention rod 608 to the laminated devises 606

Figure 8:
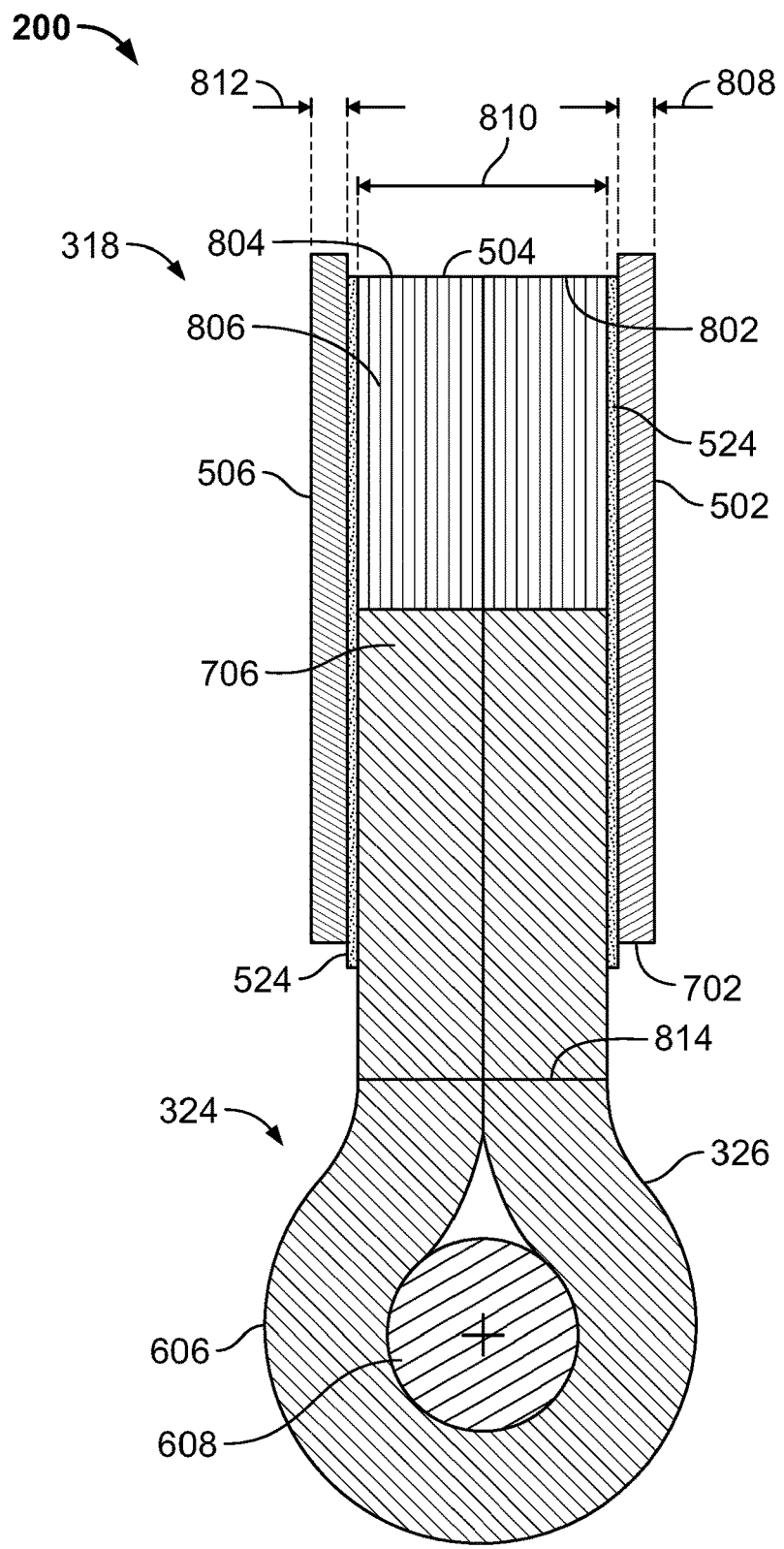
FIG. 8 is a cross-sectional view of the example fan blade containment system taken along line 8-8 of FIG. 7.

FIG. 8 a cross-sectional view of the shield 318 taken along line 8-8 of FIG. 7. Referring to FIG. 8, the second layer 504 of the illustrated example is positioned between the first layer 502 and the third layer 506. The second layer 504 of the illustrated example includes a first portion 802 (e.g., a first half of a plurality of Kevlar cloth plies) and a second portion 804 (e.g., a second half of a plurality of Kevlar cloth plies). In particular, the first portion 802 of the illustrated example is folded relative to the second portion 804 to form the laminated clevis 606 at the end 326 of the fibrous loop 424 of the second layer 504. The second layer 504 of the illustrated example may be a unitary body formed as a single continuous fibrous loop 424 or as multiple spliced fibrous loops 424. The second layer 504 of the shield 318 is configured to provide a laminated clevis 606 at each end 326 of the fibrous loops 424 that are to couple to the aircraft structure 302. The retention rod 608 of the illustrated example is positioned at the end 326 of the second layer 504 between the first portion 802 of the second layer 504 and the second portion 804 of the second layer 504. In other words, the retention rod 608 is positioned inside the laminated clevis 606, thus forming the shield termination connector 324 that mates with the lug hooks 602 of the aircraft structure 302

The first layer 502 has a thickness 808 that is less than a thickness 810 (e.g. one inch) of the second layer 504. Like the first layer 502, the third layer 506 of the illustrated example has a thickness 812 that is less than a thickness of the second layer 504. In some examples, the thickness 808 of the first layer 502 may be the same (e.g., identical) to the thickness 812 of the third layer 506 or may be different (e.g., greater than or less than) the thickness 812 of the third layer 506. A line of stitches 814 may be used to prevent the reinforced end 706 of the second layer 504 from splitting at the laminated clevis 606.

FIG. 9 is an enlarged view of the shield termination connector 324 (e.g. laminated clevis and retention rod) decoupled from (e.g., a mating one) of the lug hook 602 of the aircraft structure 302. In the illustrated example, the lug hook 602 is in an unlocked condition 900. The lug hook 602 of the illustrated example includes a lock 902 that moves between a locked condition and the unlocked condition 900. To move the lug hook 602 to the unlocked condition 900, a first end 904 of the lock (e.g., a swing arm) is decoupled (e.g., unfastened) from a body 906 of the lug hook 602 and/or the aircraft structure 302. To couple the shield termination connector 324 of the illustrated example to the lug hook 602 of the aircraft structure 302, the retention rod 608 of the shield 318 is coupled or engaged with the lug hook 602 of the aircraft structure 302 when the lug hook 602 is in the unlocked condition 900. For example, the small, "mouse-hole" shaped, access cut-out 428 formed at the end 326 of the shield 318 enables the lug hook 602 to engage the retention rod 608 positioned in the laminated clevis 606. After the retention rod 608 is positioned or engaged with the lug hook 602, the lock 902 of the lug hook 602 of the illustrated example is coupled to the body 906 of the aircraft structure 302 via a fastener 908.

FIG. 10 illustrates an enlarged view of the shield 318 coupled to the lug hook 602 of the aircraft structure 302 where the lug hook 602 in a locked condition 1000. In the locked condition 1000, the lug hook 602, the laminated clevis 606 and the retention rod 608 form the joint 328. The lock 902, in the locked condition 1000, retains the shield termination connector 324 coupled to the lug hook 602 via the rod 608. Thus, the end 326 of the shield 318 of the illustrated example provides the laminated clevis 606 to receive the rod 608 that couples the shield 318 to the aircraft structure 302. The joint 328 of the illustrated example provides a pinned laminated clevis 606 and lug hook 602 joint. The high membrane loads from a fan blade fragment impact are transferred from the second layer 504 (e.g., the dry Kevlar fabric) via the reinforced end 706 (e.g., the laminated clevis 606) to the rod 608 and then from the rod 608 to the lug hooks 602 and the aircraft structure 302.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fan blade containment system comprising:
a shield to be coupled to an aircraft structure and to at least partially surround a circumference of an aircraft engine, the shield to be spaced from an outer surface of the aircraft engine when the shield is coupled to the aircraft structure; the shield forming a laminated clevis at an end of the shield; and
a retention rod to be positioned in the laminated clevis of the shield, the retention rod is to engage a lug hook of the aircraft structure and anchor the shield to the aircraft structure.

2. The system of claim 1, wherein the end of the shield includes a small access cut-out to enable a lug hook projecting from an aircraft structure to couple to the retention rod.

3. The system of claim 1, wherein the shield includes a first layer, a second layer, and a third layer, wherein the second layer is positioned between the first layer and the third layer.

4. The A fan blade containment system comprising:
a shield to be coupled to an aircraft structure and to at least partially surround a circumference of an aircraft engine, the shield to be spaced from an outer surface of the aircraft engine when the shield is coupled to the aircraft structure, the shield forming a laminated clevis at an end of the shield, wherein shield includes a first layer, a second layer, and a third layer, the second layer is positioned between the first layer and the third layer, the first layer and the third layer are coupled to the second layer via adhesive; and
a retention rod to be positioned in the laminated clevis of the shield.

5. The A fan blade containment system comprising:
a shield to be coupled to an aircraft structure and to at least partially surround a circumference of an aircraft engine, the shield to be spaced from an outer surface of the aircraft engine when the shield is coupled to the aircraft structure, the shield forming a laminated clevis at an end of the shield, the shield includes:
a first layer;
a second layer; and
a third layer, the second layer being positioned between the first layer and the third layer, the first layer includes steel, the second layer includes a dry Kevlar fabric, and the third layer includes aluminum; and
a retention rod to be positioned in the laminated clevis of the shield.

6. The system of claim 3, wherein the second layer includes a first portion folded over a second portion to form a loop at the end.

7. The system of claim 1, wherein the end of the shield includes a composite laminate.

8. The system of claim 1, wherein the shield is a continuous or unitary body.

9. The system of claim 1, wherein the shield includes multiple discrete shield segments.

10. The system of claim 5, wherein the retention rod is to engage a lug hook of the aircraft structure and anchor the shield to the aircraft structure.

11. A fan blade containment system comprising:
a shield having a unitary body including a first end and a second end opposite the first end, the shield including impact absorbing material that is to absorb kinetic energy from fan blade fragments during a fan blade failure event;
a first retention rod coupled to the first end of the shield, the first retention rod structured to engage a first structural member of an aircraft structure to anchor the shield to the aircraft structure; and
a second retention rod coupled to the second end of the shield, the second retention rod structured to engage a second structural member of the aircraft structure to anchor the shield to the aircraft structure.

12. The system of claim 11, wherein the shield includes a first small access cut-out adjacent to the first end of the shield to enable the first retention rod to couple to the first structural member.

13. The system of claim 12, wherein the shield includes a second small access cut-out adjacent to the second end of the shield to enable the second retention rod to couple to the second structural member.

14. The system of claim 11, wherein the first end of the shield and the second end of the shield include a composite laminate.

15. The system of claim 11, wherein the first end of the shield includes a first laminated clevis to receive the first retention rod and the second end of the shield includes a second laminated clevis to receive the second retention rod.

16. The system of claim 15, wherein shield includes a first layer, a second layer and a third layer, the second layer positioned between the first layer and the third layer, the second layer forming the first laminated clevis at a first end of the second layer and the second laminated clevis at a second end of the second layer opposite the first end.

17. The system of claim 11, wherein the first structural member has an integral first lug hook and the second structural member has an integral second lug hook.

* * * * *

UNITED STATES PATENT AND TRADEMARK OFFICE
CERTIFICATE OF CORRECTION

PATENT NO. : 10,487,684 B2
APPLICATION NO. : 15/476038
DATED : November 26, 2019
INVENTOR(S) : Fracchia et al.

Page 1 of 1

It is certified that error appears in the above-identified patent and that said Letters Patent is hereby corrected as shown below:

In the Claims

Column 17, Claim 4, Line 38, delete "The".
Column 17, Claim 5, Line 51, delete "The".

Signed and Sealed this
Third Day of March, 2020

Andrei Iancu
*Director of the United States Patent and Trademark Office*